(12) United States Patent
Nagata et al.

(10) Patent No.: US 9,179,349 B2
(45) Date of Patent: *Nov. 3, 2015

(54) MOBILE TERMINAL APPARATUS, BASE STATION APPARATUS AND COMMUNICATION CONTROL METHOD

(75) Inventors: Satoshi Nagata, Tokyo (JP); Tetsushi Abe, Tokyo (JP); Yusuke Ohwatari, Tokyo (JP); Nobuhiko Miki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 13/883,308

(22) PCT Filed: Nov. 7, 2011

(86) PCT No.: PCT/JP2011/075608
§ 371 (c)(1),
(2), (4) Date: Jul. 15, 2013

(87) PCT Pub. No.: WO2012/063781
PCT Pub. Date: May 18, 2012

(65) Prior Publication Data
US 2013/0294271 A1  Nov. 7, 2013

(30) Foreign Application Priority Data
Nov. 8, 2010  (JP) .................................. 2010-250096

(51) Int. Cl.
H04W 72/08  (2009.01)
H04W 24/10  (2009.01)

(52) U.S. Cl.
CPC ............ *H04W 24/10* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 2011/0249584 A1* | 10/2011 | Barbieri et al. | ............... | 370/252 |
| 2011/0249643 A1* | 10/2011 | Barbieri et al. | ............... | 370/329 |
| 2011/0250899 A1* | 10/2011 | Vajapeyam et al. | ........... | 455/450 |
| 2012/0069756 A1* | 3/2012 | Ji et al. | ........... | 370/252 |
| 2012/0087266 A1* | 4/2012 | Vajapeyam et al. | ........... | 370/252 |
| 2012/0165029 A1* | 6/2012 | Lindbom et al. | ............... | 455/450 |
| 2012/0207025 A1* | 8/2012 | Barbieri et al. | ............... | 370/236 |
| 2013/0028217 A1* | 1/2013 | Sumasu et al. | ................ | 370/329 |
| 2013/0040675 A1* | 2/2013 | Ant et al. | ...................... | 455/509 |
| 2013/0194950 A1* | 8/2013 | Haghighat et al. | ............ | 370/252 |
| 2014/0086095 A1* | 3/2014 | Jung et al. | ...................... | 370/252 |

OTHER PUBLICATIONS

International Search Report issued in PCT/JP2011/075608 mailed Dec. 6, 2011 (2 pages).

(Continued)

*Primary Examiner* — Jenee Williams
(74) *Attorney, Agent, or Firm* — Osha Liang LLP

(57) ABSTRACT

The present invention provides a mobile terminal apparatus, a base station apparatus, and a communication control method, which allow control suitable for interference reduction in a layered network such as HetNet, and which support a next-generation mobile communication system. A mobile terminal apparatus has a receiving section (103) that receives radio frames of a pico cell, in which a protected subframe, the transmission of which by a macro cell is suppressed, and a non-protected subframe, the transmission of which by the macro cell is not suppressed, coexist, a measurement section (112) that measures reception quality from the reference signals multiplexed individually on the protected subframe and the non-protected subframe, and a transmission section (103) that notifies two types of reception quality information of the protected subframe and the non-protected subframe, measured in the measurement section (112), to a base station apparatus (20B).

18 Claims, 21 Drawing Sheets

(56) References Cited

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Decision to Grant Patent in counterpart Japanese Patent Application No. 2011-288103 mailed on Apr. 22, 2014 (4 pages).

* cited by examiner

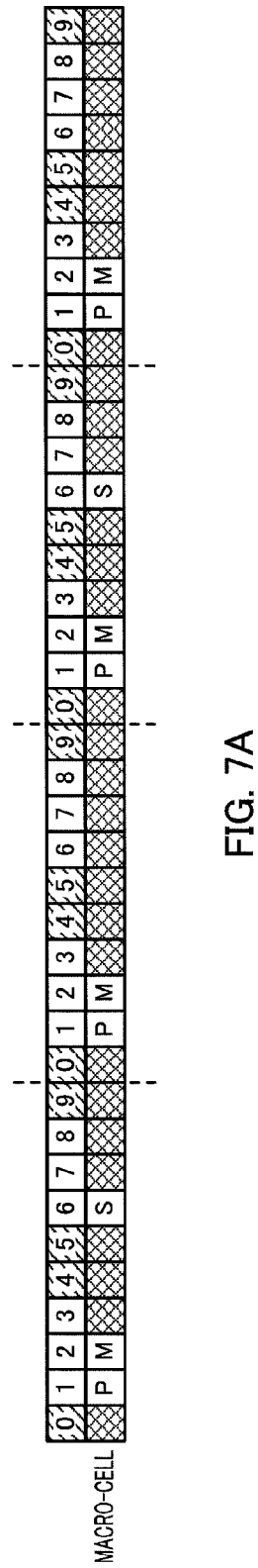
FIG. 7A
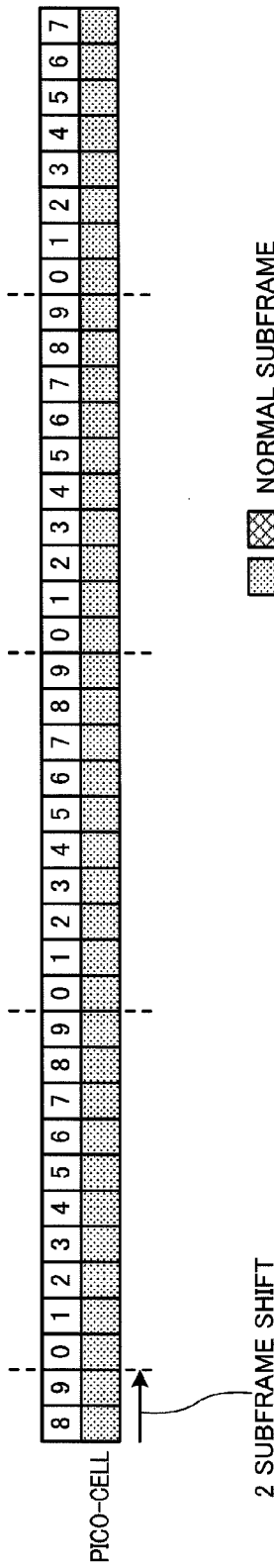
FIG. 7B
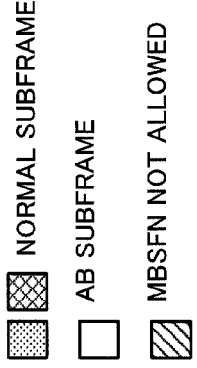
M : PROTECTION FOR PICO SUBFRAME #0 (MIB)
S : PROTECTION FOR PICO SUBFRAME #5 (SIB1)
P : PROTECTION FOR PICO SUBFRAME #1 (PAGING)

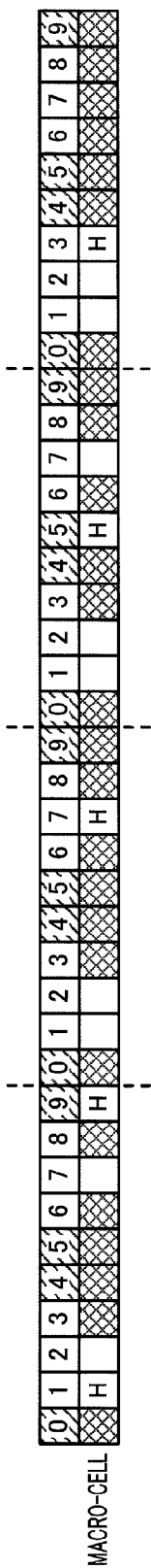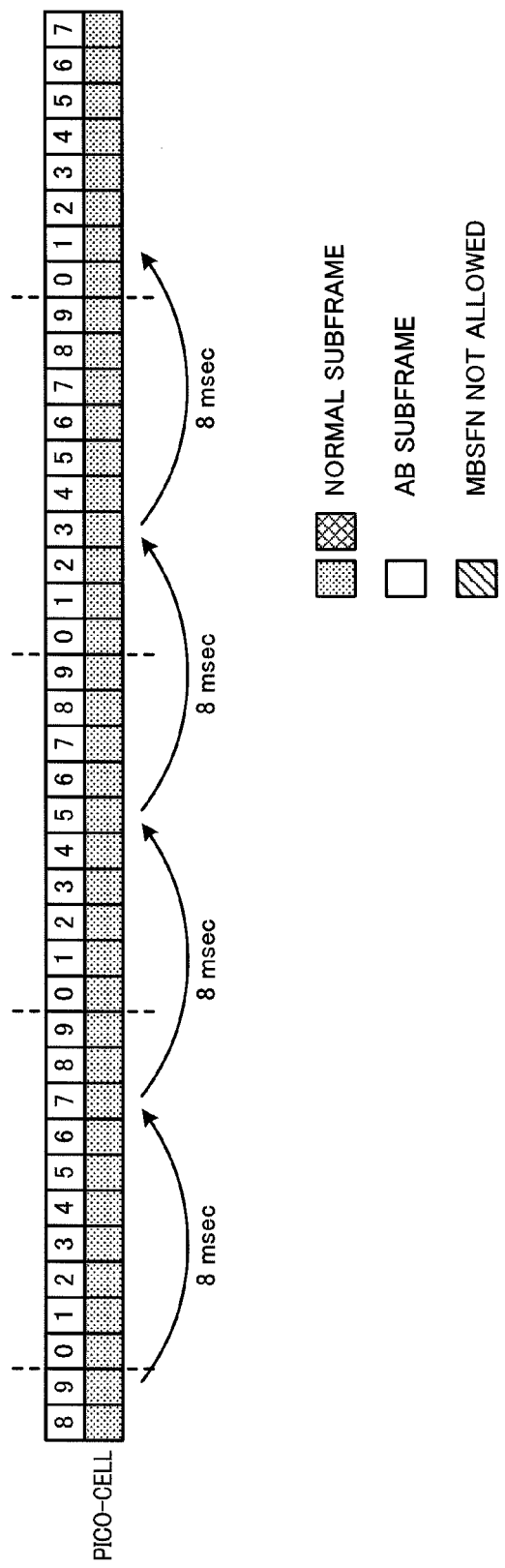
FIG. 8A
FIG. 8B

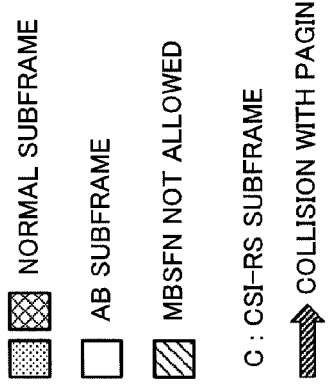
FIG. 12A
FIG. 12B

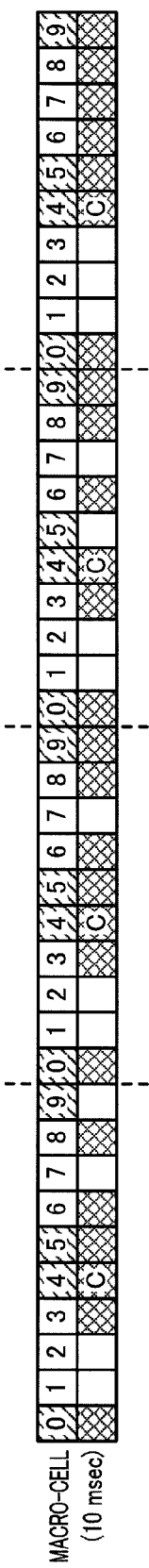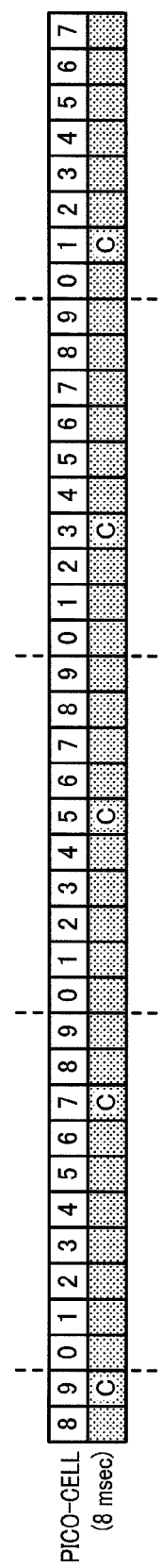
FIG. 13A
FIG. 13B

MOBILE TERMINAL APPARATUS, BASE STATION APPARATUS AND COMMUNICATION CONTROL METHOD

TECHNICAL FIELD

The present invention relates to a mobile terminal apparatus, a base station apparatus and a communication control method in a next-generation mobile communication system.

BACKGROUND ART

In a UMTS (Universal Mobile Telecommunications System) network, for the purposes of improving spectral efficiency and improving data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (non-patent literature 1). Unlike W-CDMA, LTE uses, as multiplexing schemes, OFDMA (Orthogonal Frequency Division Multiple Access) on downlink channels (downlink) and SC-FDMA (Single Carrier Frequency Division Multiple Access) on uplink channels (uplink).

In the third-generation mobile communication system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (for example, LTE-Advanced (LTE-A)). In LTE-A (LTE Release 10), a heterogeneous network (HetNet), which places significance on the local area environment, in addition to the conventional cellular environment, is under study.

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

The present invention has been made in view of the above, and it is therefore an object of the present invention to provide a mobile terminal apparatus, a base station apparatus and a communication control method that support the next generation mobile communication system and that allow control suitable for interference reduction in a layered network such as HetNet.

Solution to Problem

A mobile terminal apparatus according to the present invention includes: a receiving section that receives radio frames of a lower cell including a protected subframe being a subframe transmission from a higher cell is inhibited, and a non-protected subframe being a subframe transmission from the higher cell is not inhibited; a measurement section that measures reception quality from reference signals multiplexed individually on the protected subframe and the non-protected subframe; and a transmission section that notifies two types of reception quality information of the protected subframe and the non-protected subframe, measured in the measurement section, to a base station apparatus.

A base station apparatus of the present invention includes: a transmission section that transmits radio frames of a lower cell including a protected subframe being a subframe transmission from a higher cell is inhibited, and a non-protected subframe being a subframe transmission from the higher cell is not inhibited; a CSI-RS allocation section that multiplexes a CSI-RS, which is one of reference signals, on the protected subframe or on the non-protected subframe, in a predetermined cycle; a CRS allocation section that multiplexes a CRS, which is one of the reference signals, on each subframe constituting the radio frames of the lower cell; a receiving section that receives two types of reception quality information of the protected subframe and the non-protected subframe that is fed back from a mobile terminal apparatus having received the radio frames in the lower cell; and a user data allocation section that allocates radio resources to the mobile terminal apparatus using the two types of reception quality information fed back from the mobile terminal apparatus.

Technical Advantage of the Invention

According to the present invention, it is possible to provide a mobile terminal apparatus, a base station apparatus and a mobile communication control method that support the next generation mobile communication system and that allow control that is suitable for interference reduction in a layered network such as HetNet.

BRIEF DESCRIPTION OF THE DRAWINGS

FIG. 7 provides diagrams to explain an ABS pattern in HetNet;

FIG. 8 provides diagrams to explain another ABS pattern in HetNet;

FIG. 12 is diagram to explain a fourth example of a CSI feedback method;

FIG. 13 is a diagram to explain a fifth example of a CSI feedback method;

DESCRIPTION OF EMBODIMENTS

Figure 1:
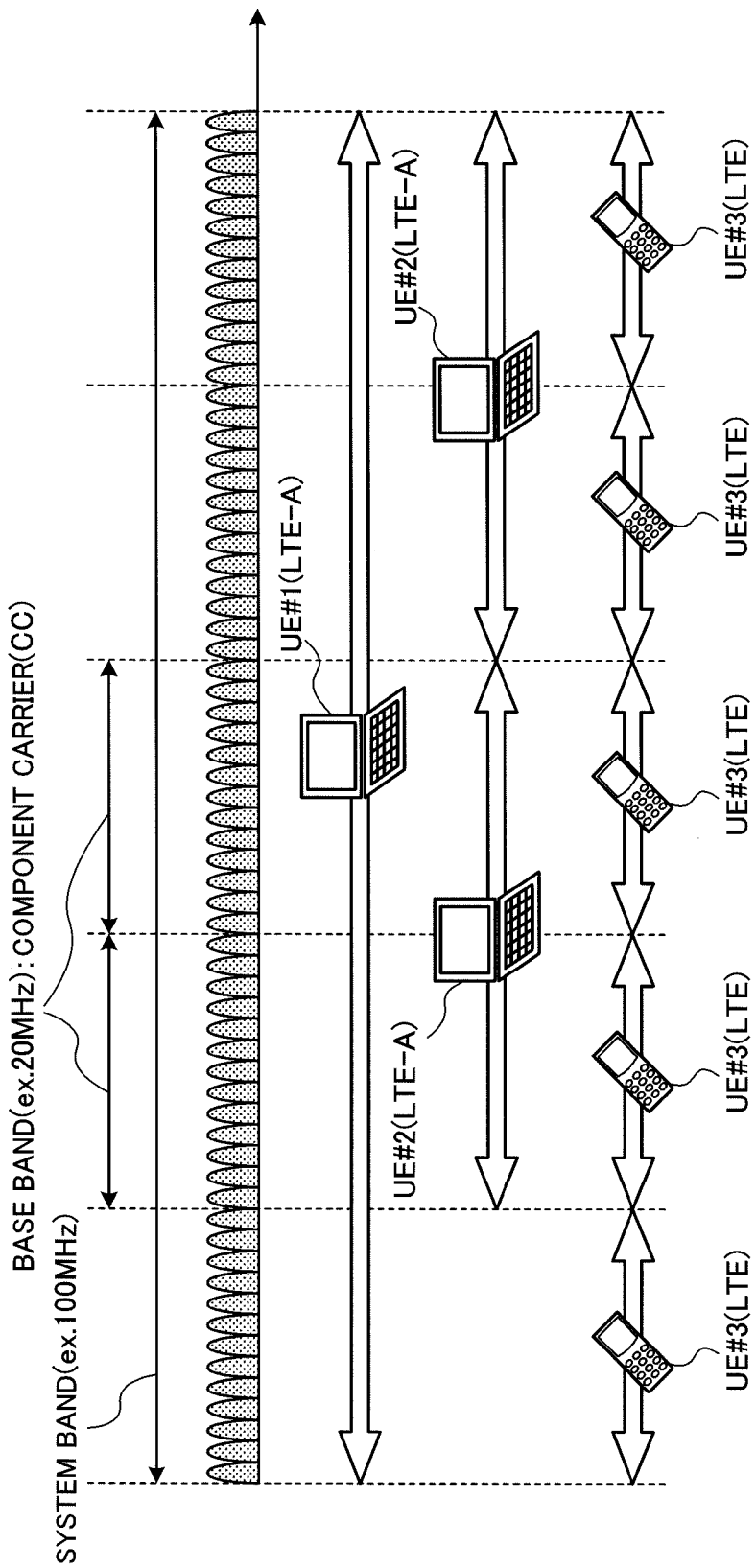
FIG. 1 is a diagram to explain a system band in an LTE system.

The present invention is applicable to the LTE/LTE-A system, which is one next generation mobile communication system. First, an overview of the LTE/LTE-A system will be described. FIG. 1 is a diagram for explaining the state of use of frequency when mobile communication is carried out on the downlink. Note that, in the following descriptions, a fundamental frequency block will be described as a component carrier. The example shown in FIG. 1 is the state of use of frequency when an LTE-A system, which is the first communication system having the first system band that is formed with a plurality of component carriers and that is relatively wide, and an LTE system, which is a second communication system having a second system band that is relatively narrow (and that is formed with one component carrier here), coexist. In the LTE-A system, for example, radio communication is carried out using a variable system bandwidth of 100 MHz or below, and, in the LTE system, radio communication is carried out in a variable system bandwidth of 20 MHz or below. The system band of the LTE-A system is at least one fundamental frequency block (component carrier: CC), where the system band of the LTE system is one unit. Coupling a plurality of fundamental frequency blocks into a wide band as one in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and has a system band of 100 MHz. UE #2 is a mobile terminal apparatus to support the LTE-A system (and also support the LTE system), and has a system band of 40 MHz (20 MHz×2=40 MHz). UE #3 is a mobile terminal apparatus to support the LTE system (and not support the LTE-A system), and has a system band of 20 MHz (base band).

Figure 2:
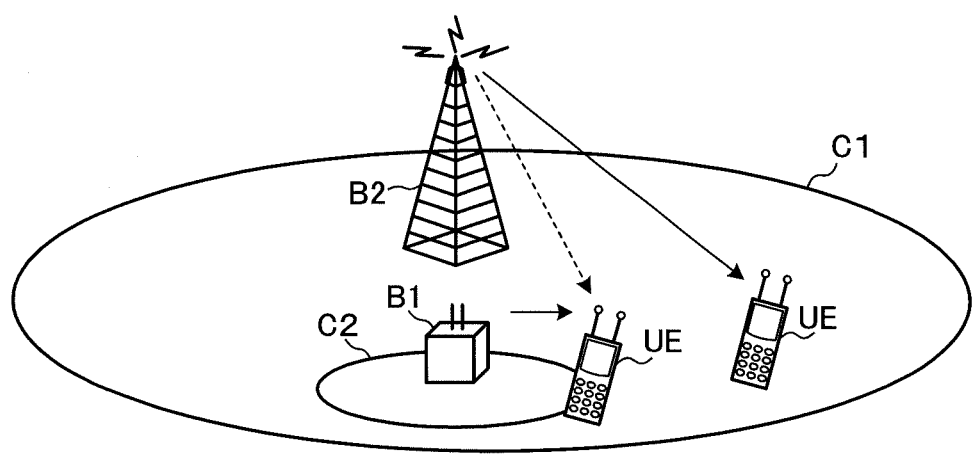
FIG. 2 is a diagram to explain an overview of a heterogeneous network.

In the LTE-A system, a heterogeneous network (hereinafter referred to as "HetNet") configuration, which places significance on the local area environment, is under study. HetNet is a layered network, which overlays cells of various forms such as a pico cell C2, a femto cell and so on (small-sized cells), on top of an existing macro cell C1 (large-sized cell), as shown in FIG. 2. In this HetNet, the downlink transmission power of the base station apparatus (the macro base station) B2 of the macro cell C1, which covers a relatively wide area, is set greater than in the base station apparatus (the pico base station) B1 of the pico cell C2, which covers a relatively narrow area.

Figure 3:
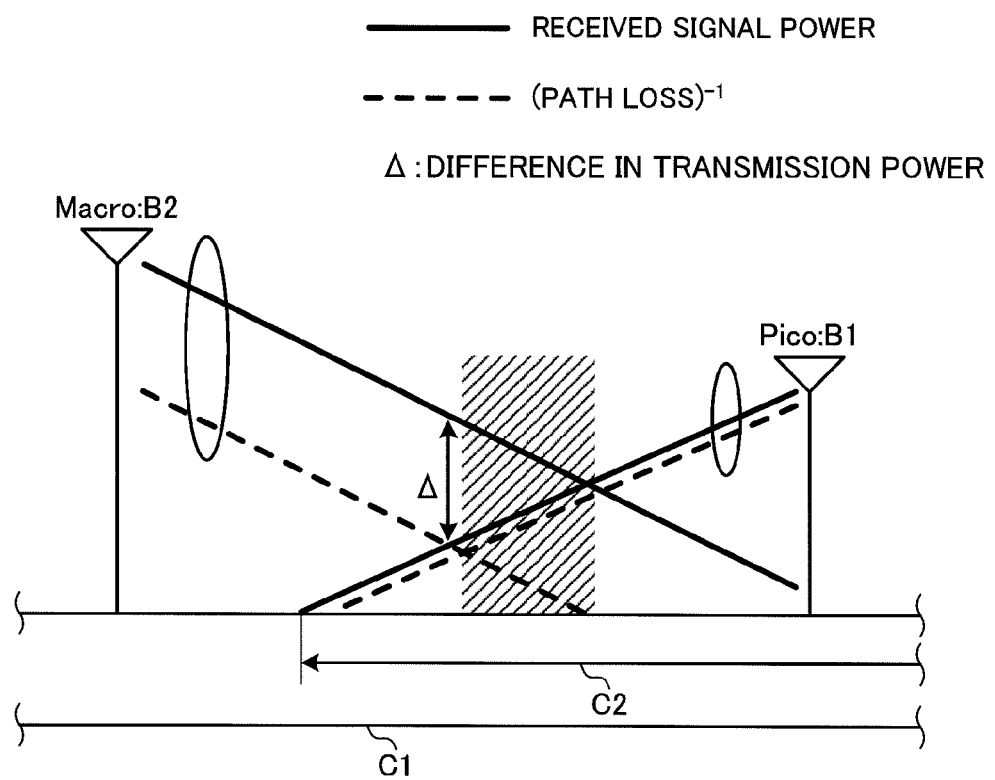
FIG. 3 is a diagram to explain interference of macro cell and pico cell radio frames.

In this way, HetNet is a layered network, in which the pico base station B1 having lower transmission power (and cell area) is present under the macro base station B2 having greater transmission power (and cell area). In the layered network, there is a problem that a UE that is in a cell edge of the pico cell C2 is unable to connect with the pico cell C2, although the UE is located in a close position to the pico base station B1. As shown in FIG. 3, in the cell edge of the pico cell C2, the transmission power of the macro base station B2 is greater than the transmission power of the pico base station B1. As a result of this, the UE at the cell edge of the pico cell C2 is unable to catch the radio frames from the pico base station B1 of the pico cell C1, and connects with the macro cell C1 by catching the radio frames from the macro base station B2 of greater transmission power. This means that the original area of the pico cell C2 is invaded by the macro base station B2 and becomes smaller.

Figure 4:
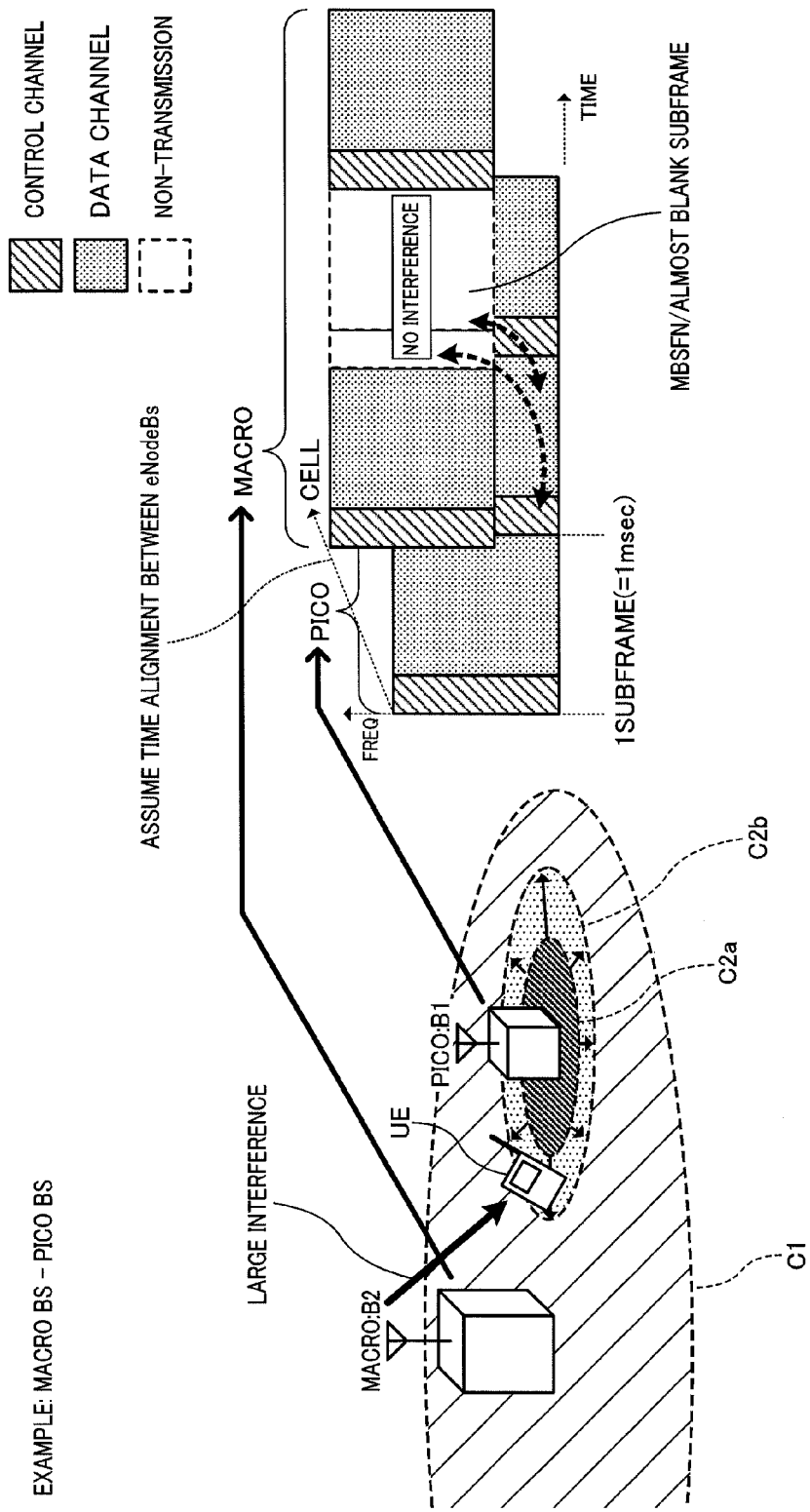
FIG. 4 is a diagram to explain an interference coordination method in a pico cell radio frame.

FIG. 4 is a conceptual diagram of interference coordination for reducing interference from a macro base station of greater transmission power, against a pico base station. In LTE, MBSFN (Multimedia Broadcast multicast service Single Frequency Network) subframes are defined. An MBSFN subframe is a subframe which can be made a blank period except for the control channel. In the time domain interference coordination shown in FIG. 4, a subframe (ABS: Almost Blank Subframe) to serve as a non-transmission period is provided in a radio frame transmitted by the macro base station B2, using an MBSFN subframe, and the radio resource of the ABS period is allocated to a pico UE that is located near the cell edge C2b of the pico cell C2. It is possible to transmit the reference signals (cell-specific reference signal (CRS) and positioning reference signal), synchronization signal, broadcast channel and paging in an ABS period, but no others (the data channel and so on) are transmitted.

When the radio resource of an ABS period is allocated to a UE located near the cell edge C2b of the pico cell C2, in the ABS period, the UE is able to connect with the pico cell C2 without being influenced by the transmission power of the macro base station B2. On the other hand, even when radio resources outside an ABS period are allocated to a UE near the cell center C2a of the pico cell C2, the transmission power from the pico base station B1 is greater than the transmission power from the macro base station B2, and therefore the UE is able to connect with the pico cell C2.

Figure 5:
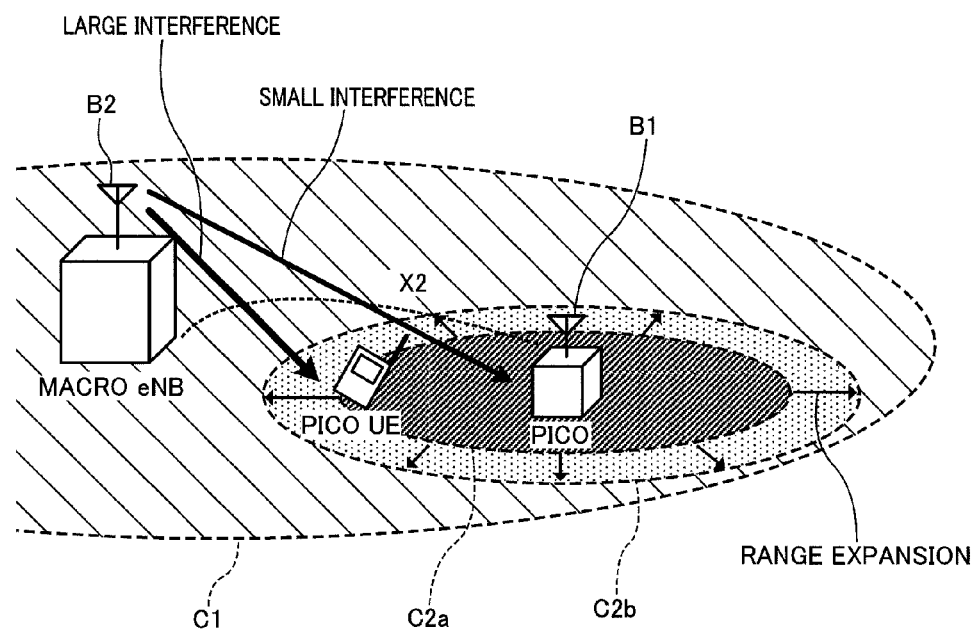
FIG. 5 is an explanatory diagram to show an example of a user data allocation method in a base station apparatus on the pico cell side.

Now, as shown in FIG. 5, near the cell edge C2b of the pico cell C2, the transmission power from the macro base station B2 has great influence and there is severe interference, but, near the cell center C2a of the pico cell C2, there is little interference from the macro base station B2. Consequently, near the cell edge C2b of the pico cell C2, the received SINR increases in an ABS period, but the received SINR decreases outside the ABS period. In the following descriptions, a period in which signals transmitted from a pico base station are protected from macro interference will be referred to as a "protected subframe," and a subframe, in which no special measure is taken to protect signals transmitted from the pico base station from macro interference, will be referred to as a "non-protected subframe" or a "normal subframe." For a special measure to protect the CSI-RS of the pico cell from macro interference, it is possible to use muting in the macro cell, in addition to the use of ABS periods in the macro cell such as described above.

Figure 6:
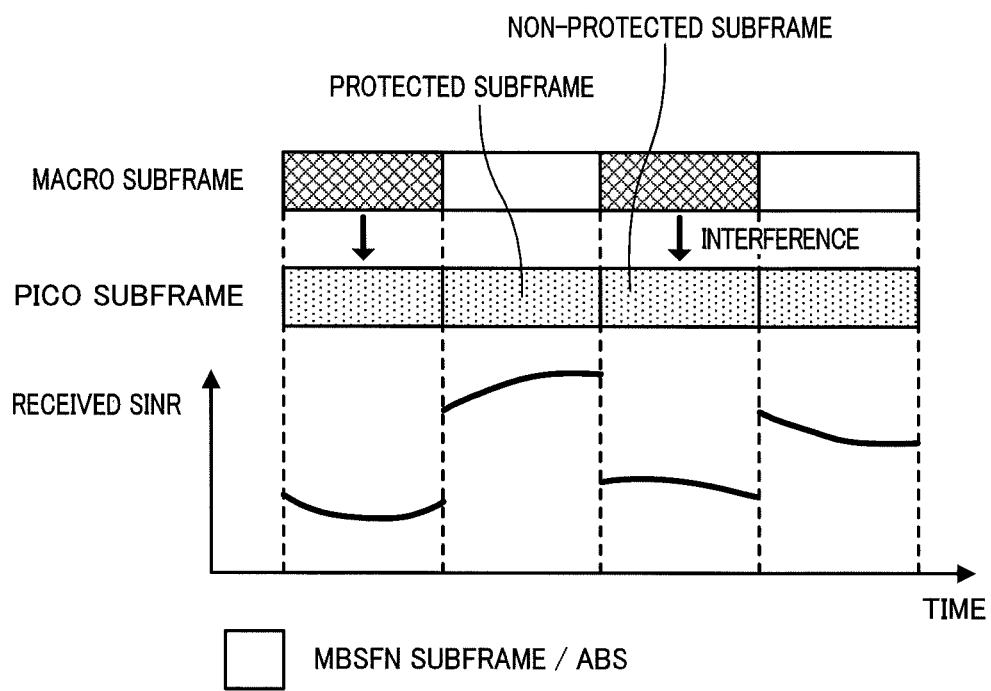
FIG. 6 is a diagram to show the relationship between protected/non-protected subframes and their received SINRs.

FIG. 6 is a diagram to show the relationship between protected subframes and non-protected subframes, and their received SINRs, near the cell edge C2b. Near the cell edge C2b, interference from the macro base station B2 is large, so that, although the received SINR decreases significantly in the non-protected subframes, in the protected subframes, interference from the macro base station B2 is low and the received SINR improves significantly.

Here, in LTE, the CRS (Cell-specific Reference Signal), which is a reference signal that is shared between cells, is defined with respect to the downlink. The CRS is used not only to demodulate downlink data signals but is also used for mobility measurement and channel quality information (CQI: Channel Quality Indicator) measurement as well. Also, in 3GPP, LTE-A, which is presently under study for standardization, is planning to define a cell-common CSI-RS (Channel State Information Reference Signal), for dedicated use of CQI measurement, in addition to the CRS. The E-UTRAN frame structure defines a radio frame of 10 ms as a collected body of twenty, evenly divided 0.5-ms slots, where two consecutive slots are referred to as a "subframe," and ten subframes are collected in one frame. The CRS is multiplexed on each subframe, but the CSI-RS is multiplexed in a long cycle, such as once in a plurality of subframes.

If a UE in the cell edge C2b of the pico base station B1 is able to allocate radio resources to protected subframes, then the UE has only to measure CSI-RS quality in the protected subframes alone, and send feedback to the pico base station B1. Also, as for a UE that is located in the cell center C2a of the pico base station B1, given that radio resources can be allocated to non-protected subframes, the UE has only to measure CSI-RS quality in the non-protected subframes alone, and send feedback to the pico base station B1. Note that, in the cell center C2a of the pico cell C2, interference from the macro base station B2 is limited. Consequently, there is not much difference in CSI-RS quality between protected subframes and non-protected subframes. The UE in the cell center C2a is able to measure the CSI-RS quality multiplexed on protected subframes or non-protected subframes and send feedback to the pico base station B1.

On the other hand, as shown in FIG. 5, a border UE, which is located near the border between the cell center C2a and the cell edge C2b of the pico base station B1, may have radio resources allocated to protected subframes and non-protected subframes. However, although not as much as with the UE near the cell edge C2b, a significant difference in CSI-RS quality may be produced between protected subframes and non-protected subframes. Given that the CSI-RS quality is out of balance between protected subframes and non-protected subframes, the pico base station B1 should allocate radio resources to the border UE by taking into account the CSI-RS quality in both protected subframes and non-protected subframes.

The present inventors have arrived at the present invention by focusing upon the fact that, in a layered network, in which a pico cell that is formed by a pico base station having lower transmission power is overlaid on a macro cell that is formed by a macro base station having greater transmission power, a UE (pico cell-edge UE) that suffices by feeding back only the reception quality information (CSI) of protected subframes, a UE (border UE) that needs to feed back two types of CSI of protected subframes and non-protected subframes, and a UE (pico cell center UE) that may feed back the CSI of either protected subframes or non-protected subframes, all coexist. The present invention provides a CSI feedback method that is optimal for pico UE radio resource allocation for protected/non-protected subframes using CSI feedback in a pico base station.

The first aspect of the present invention provides a mobile station apparatus that feeds back two types of CSI of protected subframes and non-protected subframes, to a pico base station. Hereinafter, processes that may be carried out on the UE side to feed back two types of CSI to a pico base station will be described in detail.

ABS patterns in HetNet will be described with reference to FIG. 7 and FIG. 8. Macro cell and pico cell radio frames are formed with, for example, ten subframes (from #0 to #9). The figures show examples where the radio frames of the pico cell are two subframes shifted with respect to the radio frames of the macro cell. It is possible to place MBSFN subframes in six subframes #1, #2, #3 #6, #7 and #8, in one radio frame.

In the ABS pattern shown in FIG. 7, MBSFN subframes #1, #2 and #7 are set as ABS periods. A paging channel for transmitting synchronization signals (PSS/SSS) is allocated to subframe #9 of the pico cell (which corresponds to MBSFN subframe #1 of the macro cell), a broadcast channel (PBCH) for transmitting MIB is allocated to subframe #0 of the pico cell (which corresponds to MBSFN subframe #2 of the macro cell), and a broadcast channel (PBCH) for transmitting SIB 1 is allocated to subframe #5 of the pico cell (which corresponds to MBSFN subframe #7 of the macro cell). In this way, by allocating macro ABSs (MBSFN subframes #1, #2 and #7) in subframes in which important control signals are transmitted in the pico cell, it is possible to protect important pico subframes.

In the ABS pattern example shown in FIG. 8, UL HARQ is transmitted in an 8-ms cycle in the pico cell. In the macro cell radio frames, subframes corresponding to UL HARQ transmission subframes are set as ABS periods. The ABSs in the macro cell radio frames are set outside the MBSFN subframes as well.

In this way, the ABS pattern in the macro cell radio frames is not a regular interval, but is an arrangement that is uneven in the time domain. In the following descriptions, the ABS pattern shown in FIG. 8 will be described as an example for ease of explanation, but the ABS pattern is not limited to one.

Figure 9A:
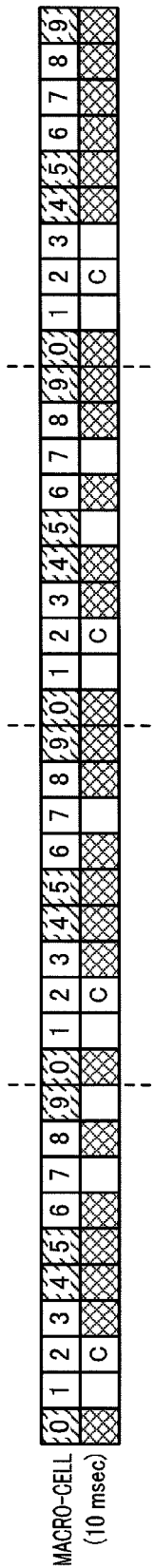
FIG. 9 provides diagrams to explain the first example of a CSI feedback method.
Figure 9B:
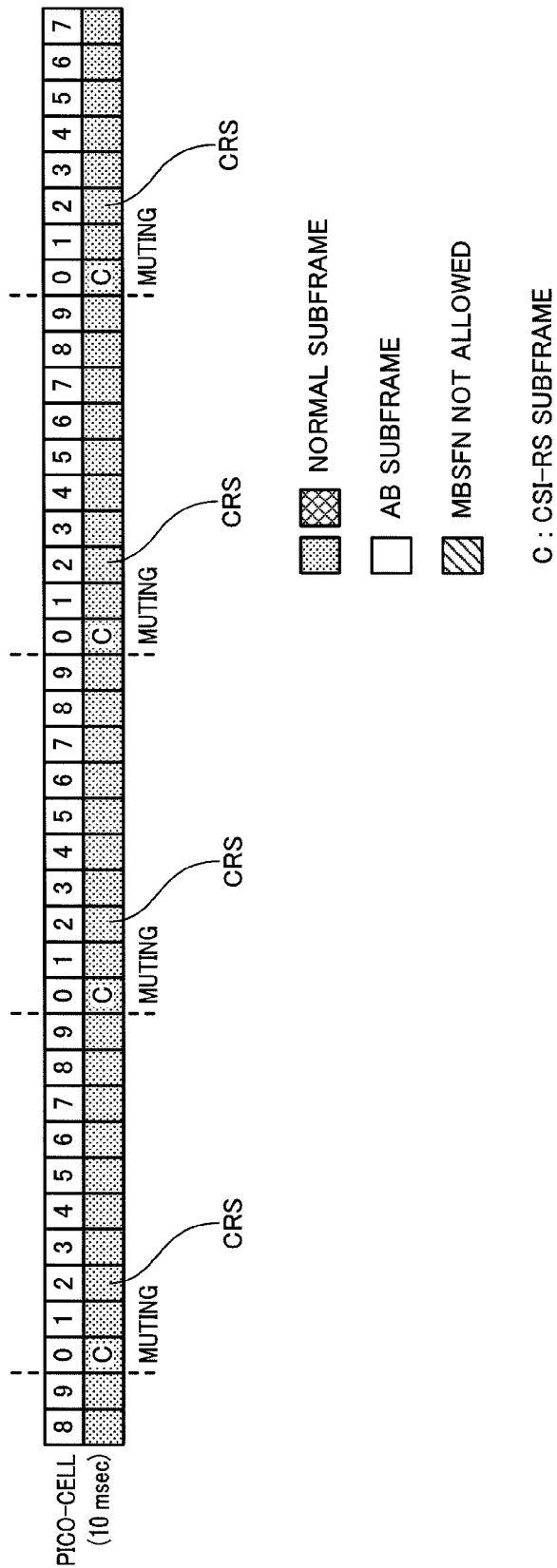

Specific examples of a CSI feedback method according to the present invention are shown in FIG. 9 to FIG. 13. FIG. 9 shows the first example of a CSI feedback method. In the CSI feedback method shown in FIG. 9, a pico UE estimates interference using the CSI-RSs in the subframes where the CSI-RS is multiplexed, and notifies reception quality information (CSI) to the pico base station, and, in subframes which are different from the subframes where the CSI-RS is multiplexed, the UE estimates interference using the CRSs, and notifies reception quality information (CSI) to the pico base station.

Radio frames to be transmitted in the macro cell have the same ABS pattern as the ABS pattern shown in FIG. 8. The macro base station transmits radio frames having the ABS pattern shown in FIG. 8. In an ABS period in a radio frame, channel transmission is stopped except for the reference signals, synchronization signals, broadcast channel and paging, and, in subframes other than the ABSs, channel transmission is carried out, including the reference signals. The macro base station transmits the CSI-RS (macro CSI-RSs) in a 10-ms cycle. In the radio frames shown in FIG. 9, the macro CSI-RS is transmitted in subframe #2. Subframe #2 is one of the ABSs (macro ABSs) in the macro cell radio frames.

The pico base station transmits the CSI-RS (pico CSI-RS) in the same cycle (10 ms) as in the macro cell. Furthermore, subframe #0, in which the pico CSI-RS is transmitted, corresponds to subframe #2, which transmits the macro CSI-RS in the macro cell. In subframe #0 in the pico cell radio frames corresponds to a macro ABS and therefore is a protected subframe. That is to say, an example is shown in which, in the pico cell, all the pico CSI-RSs are transmitted in protected subframes.

Also, the CRS is multiplexed on all of subframes #0 to #9 in the pico cell radio frames. In pico subframe #0, the pico CSI-RS and the CRS are multiplexed. The CSI-RS is allocated not to overlap the user data, the CRS and the DM-RS, in one resource block (12 subcarriers×14 OFD symbols) defined in LTE. From the perspective of suppressing PAPR, resources that can transmit the CSI-RS are allocated two resource elements that neighbor each other in the time axis direction as a set. For example, forty resource elements are secured as CSI-RS resources. To these forty resource elements, the CSI-RS allocation pattern is applied in accordance with the number of CSI-RS ports (the number of antennas).

Also, the pico base station stops transmitting the data channel (PDSCH) with respect to subframe #0, which transmits the pico CSI-RS (muting).

The macro CSI-RS that is transmitted in macro subframe #2, which corresponds to pico subframe #0, has large transmission power. In the pico cell, in subframes in which the macro CSI-RS is transmitted, the PDSCH of the pico cell is muted, so that it is possible to prevent the PDSCH of the pico cell from being damaged by the macro CSI-RS.

Now, CSI measurement (interference measurement) and CSI feedback in the pico UE will be described. The pico UE receives the pico CSI-RS transmitted from the pico base station in subframe #0, which is a protected subframe, and estimates interference from the pico CSI-RS. Consequently, given that subframe #0 in the pico cell is a protected subframe, accurate interference measurement is made possible in an environment in which there is small interference from the macro base station.

Now, in the pico cell, the subframes in which the pico CSI-RS is transmitted are all protected subframes. Consequently, interference of non-protected subframes cannot be estimated using the pico CSI-RS alone. For a border UE that is located in the border between the pico cell edge and the pico cell center has radio resources allocated to both protected subframes and non-protected subframes, so that two types of CSI of protected subframes and non-protected subframes are required.

When the CSI of non-protected subframes is necessary, the pico UE estimates interference using the CRS in non-protected subframes. In the ABS pattern shown in FIG. 9, a non-protected subframe in the pico cell is, for example, pico subframe #2, which corresponds to subframe #4 of the macro cell.

The pico base station performs signaling of control signals for measuring two types of CSI, to the pico UE. The pico base station notifies control signals to specify the subframe for CSI measurement with respect to the pico UE. The pico UE specifies a non-protected subframe to estimate interference using the CRS, based on the control signals notified from the pico base station, and estimates interference using the CRS in the non-protected subframe. The CSI of the non-protected subframe is fed back to the pico base station.

As described above, when the pico UE estimates interference using the CSI-RS, the pico UE acquires CSI by estimating interference only in protected subframes (for example, subframe #0). Also, when the CSI of non-protected subframes is necessary, it is possible to estimate interference using the CRS in non-protected subframes (for example, pico subframe #2). Then, it is possible to feed back two types of CSI, namely the CSI acquired by estimating interference in protected subframes (subframe #0) and the CSI acquired by estimating interference in non-protected subframes, to the pico base station.

Figure 10A:
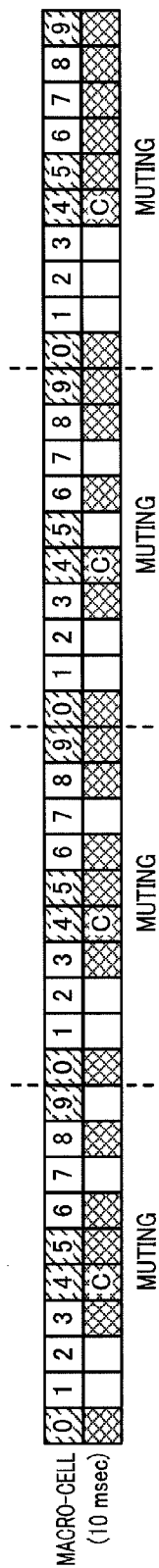
FIG. 10 provides diagrams to explain a second example of a CSI feedback method.
Figure 10B:
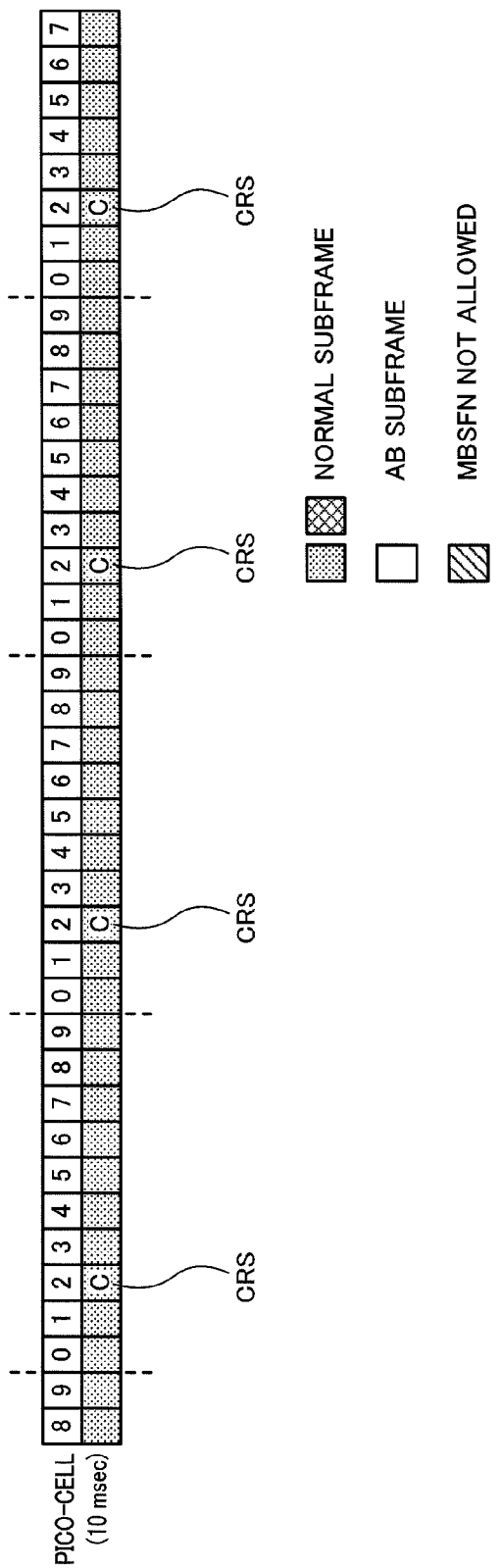

FIG. 10 shows a second example of a CSI feedback method. With the CSI feedback method shown in FIG. 10, in one subframe where the CSI-RS is multiplexed, the pico UE estimates interference using the CSI-RS and the CRS, which are two types of reference signals, and feeds back two types of CSI to the pico base station.

Although the macro base station transmits the macro CSI-RS in a 10-ms cycle, the transmission subframe of the macro CSI-RS is subframe #4, which is outside an ABS. The pico base station transmits the pico CSI-RS in the same cycle as in the macro cell, using pico subframe #2 corresponding to macro CSI-RS transmission subframe #4.

Figure 14A:
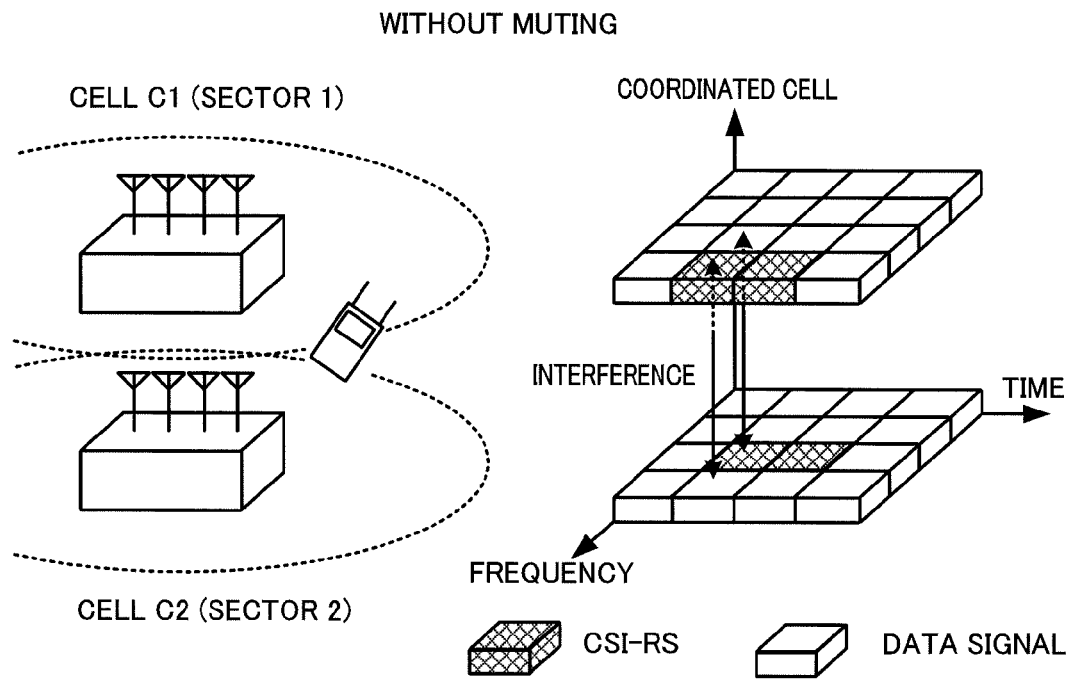
FIG. 14 is a diagram to explain muting in HetNet.
Figure 14B:
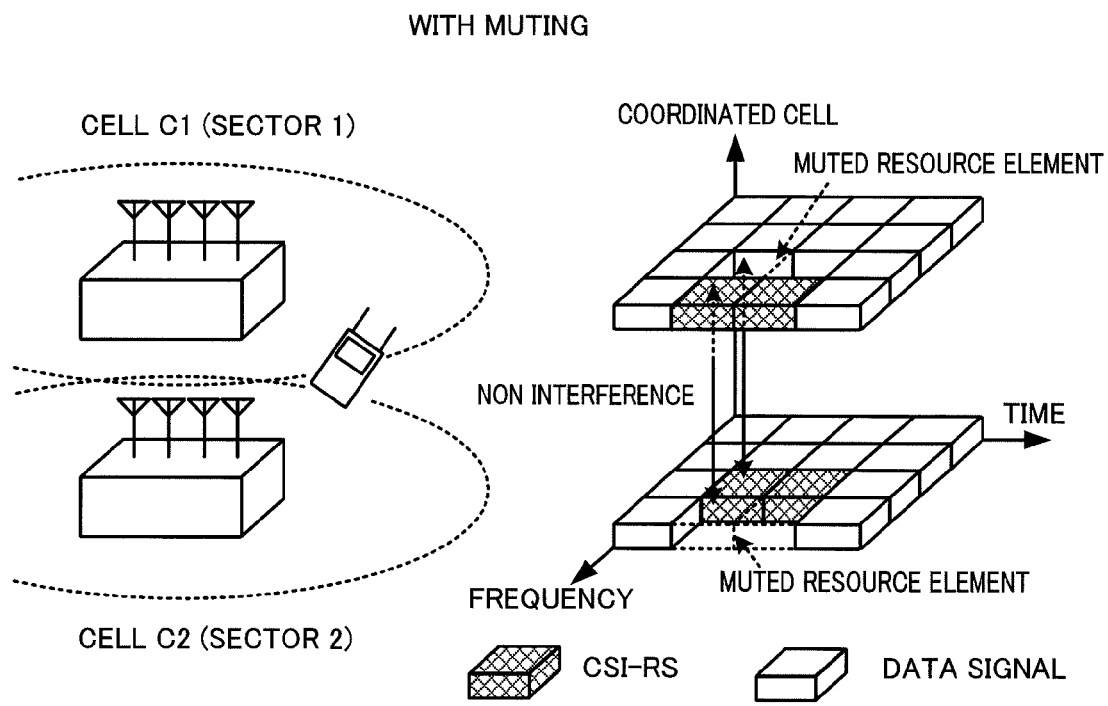

In macro CSI-RS transmission subframe #4, the macro base station mutes the resource corresponding to the CSI-RS transmission resource of the pico cell. By the muting by the macro base station, interference against the pico CSI-RS transmitted by the pico base station is reduced. For example, as shown in FIG. 14A, in the downlink resources of the macro cell C1, user data is allocated in association with the CSI-RS of the pico cell C2. Also, in the downlink resources of the pico cell C2, user data is allocated in association with the CSI-RS of the macro cell C1. In particular, the user data of the macro cell C1 constitutes an interference component of the pico CSI-RS in the pico cell C2, and becomes a factor to damage the accuracy of channel quality estimation in the pico UE. Then, as shown in FIG. 14B, in the downlink resource block of the macro cell C1, muting resources are set in accordance with the CSI-RS of the pico cell C2.

Here, the muting of macro subframe #4 corresponding to pico CSI-RS transmission subframe #2 protects the pico CSI-RS. Consequently, although pico CSI-RS transmission subframe #2 is not an ABS period, pico CSI-RS transmission subframe #2 still functions as a protected subframe. Meanwhile, in pico CSI-RS transmission subframe #2, the CRS is multiplexed, on a different resource from the pico CSI-RS. The resource in which the CRS is transmitted in the pico cell C2 corresponds to a resource that is not muted in the macro cell C1. Consequently, even in subframe #2, which serves as a protected subframe from the perspective of the pico CSI-RS, the CRS resource receives interference from the macro base station. A protected subframe seen from the pico CSI-RS may still be identified as a non-protected subframe seen from the CRS arranged in the same subframe.

Consequently, when interference is estimated using the pico CSI-RS in pico subframe #2, the CSI of a protected subframe is acquired, and, when interference is estimated using the CRS, the CSI of a non-protected subframe is acquired. In this way, the pico UE estimates interference using both the pico CSI-RS and the CRS in the same subframe #2 of the pico cell, acquires two types of CSI, and feeds back the two types of CSI to the pico base station.

Note that it is preferable to assign radio resources to the pico UE in the pico cell edge using the feedback CSI of subframes corresponding to the macro ABSs. In this case, the pico base station notifies information for specifying the subframe positions corresponding to the macro ABSs, to the pico UE. In a subframe corresponding to a macro ABS, the pico UE estimates interference using the CRS, and feeds back CSI to the pico base station.

In this way, in one subframe, it is possible to estimate interference using the CSI-RS and the CRS, which are two types of reference signals, and feed back two types of CSI to the pico base station. Also, when the CSI of a subframe which corresponds to a macro ABS and which does not receive interference from the macro cell is necessary, it is possible to estimate interference using the CRS in a pico subframe corresponding to a macro ABS, and feed back CSI.

Figure 11A:
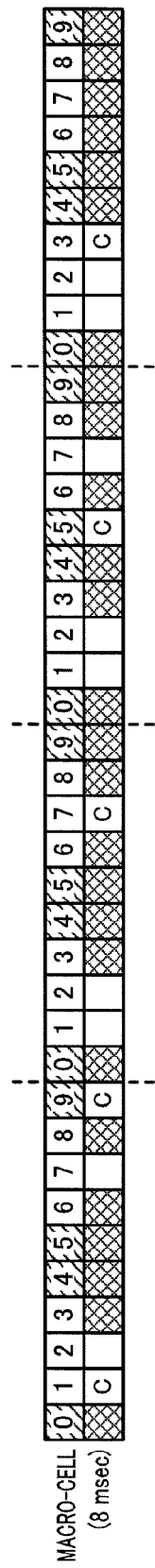
FIG. 11 provides diagrams to explain a third example of a CSI feedback method.
Figure 11B:
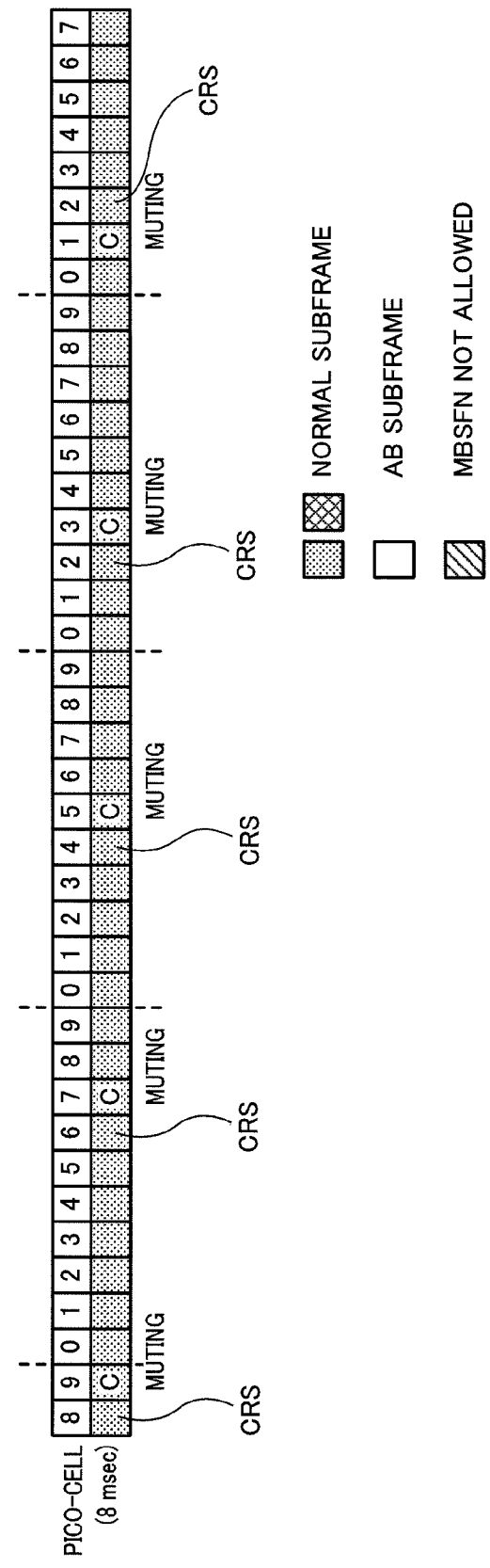

FIG. 11 shows a third example of a CSI feedback method. The macro base station and the pico base station both transmit the CSI-RS in an 8-ms cycle. Then, the macro base station transmits the macro CSI-RS in the macro ABSs. The pico base station transmits the pico CSI-RS in pico subframes corresponding to the macro CSI-RS transmission subframes. The macro CSI-RS is always transmitted in a macro ABS, so that the subframes to transmit the pico CSI-RS are protected subframes.

In the pico cell, the subframes in which the pico CSI-RS is transmitted and received are all protected subframes. Consequently, even when CSI feedback for a non-protected subframe is necessary, CSI measurement of a non-protected subframe using the pico CSI-RS alone is not possible.

When the CSI of a non-protected subframe is necessary, the pico UE estimates interference using the CRS in a non-protected subframe. In the ABS pattern shown in FIG. 11, a subframe that is, for example, one subframe shifted to the left from the subframe to measure the CSI-RS in the pico cell, serves as a non-protected subframe. Note that, when the pico CSI-RS transmission subframe is #3, a shift of one subframe to the right gives a non-protected subframe.

Also, in the pico cell, the pico base station carries out muting so as to stop the transmission of the data channel (PDSCH) with respect to the subframes to transmit the pico CSI-RS. In the pico cell, in subframes in which the macro CSI-RS is transmitted, by muting the PDSCH of the pico cell, it is possible to prevent the PDSCH of the pico cell from being damaged by the macro CSI-RS having large transmission power.

The pico UE receives the pico CSI-RS transmitted from the pico base station in subframes #1, #9, #7, #5 and #3, which are protected subframes, and estimates interference. Then, since subframes #9, #7, #5, #3 and #1 in the pico cell are protected subframes, accurate interference estimation is made possible, under an environment in which there is little interference from the macro base station.

When the CSI of a non-protected subframe is necessary, the pico UE shifts the CRS measurement subframe from a protected subframe to a non-protected subframe.

As described above, the pico UE estimates interference using the CSI-RS in protected subframes and also estimates interference using the CRS in non-protected subframes. Then, it is possible to feed back two types of CSI, namely the CSI that is acquired by estimating interference in protected subframes, and the CSI that is acquired by estimating interference in non-protected subframes, to the pico base station.

FIG. 12 shows a fourth example of a CSI feedback method. The macro base station and the pico base station transmit the CSI-RS in different cycles. In the example shown in this figure, the macro base station transmits the macro CSI-RS in an 8-ms cycle, in normal subframes and in protected subframes (ABSs). The pico base station transmits the pico CSI-RS in a 10-ms cycle.

The pico base station transmits part of the pico CSI-RSs in pico subframes corresponding to normal subframes of the macro cell, and transmits the rest of the pico CSI-RSs in pico subframes corresponding to the ABSs (protected subframes) of the macro cell.

The pico UE estimates interference using the pico CSI-RSs of pico subframes corresponding to normal subframes of the macro cell, and also estimates interference using the pico CSI-RSs of pico subframes corresponding to the ABSs (protected subframes) of the macro cell. By this means, it is possible to acquire two types of CSI of normal subframes and macro ABSs (protected subframes) using the CSI-RS, and the two types of CSI are fed back to the pico base station.

The pico base station is able to recognize whether a subframe position where the pico UE feeds back the CSI is a normal subframe or a macro ABS (protected subframe). Consequently, the pico base station is able to separate two types of CSI received from the pico UE, into the CSI of normal subframes and the CSI of macro ABSs (protected subframes).

FIG. 13 shows a fifth example of a CSI feedback method. The macro base station and the pico base station transmit the CSI-RS in different cycles. In the example shown in this figure, the macro base station transmits the macro CSI-RS in normal subframes, in a 10-ms cycle. The pico base station transmits the pico CSI-RS in protected subframes corresponding to macro ABSs, in an 8-ms cycle.

Since the pico CSI-RS is always arranged in a protected subframe corresponding to a macro ABS, by estimating interference using the pico CSI-RS, the pico UE acquires only the CSI of protected subframes. Meanwhile, the CSI of non-protected subframes (normal subframe) is acquired by estimating interference using the CRS in subframes which are shifted from the subframes in which the pico CSI-RS is transmitted and which are apart from the ABSs.

As described above, the pico UE estimates interference in protected subframes using the CSI-RS, and also estimates interference in non-protected subframes using the CRS. Then, it is possible to feed back two types of CSI, namely the CSI acquired by estimating interference in protected subframes and the CSI acquired by estimating interference in non-protected subframes, to the pico base station.

A second aspect of the present invention provides a pico base station that sends signaling of control signals for measuring two types of CSI, to a pico UE, and the pico UE to receive the signaling from the pico base station and measure the two types of CSI.

The pico base station notifies a time offset value for specifying the subframes to measure two types of CSI of protected subframes and non-protected subframes, to the pico UE. The signaling of the time offset value in the pico cell may adopt higher layer signaling.

When interference is estimated using reference signals in subframes where the CSI-RS is multiplexed and in subframes that are different from the subframes where the CSI-RS is multiplexed, the time offset value from the subframes where the CSI-RS is multiplexed, is signaled to the pico UE.

For example, the CSI feedback method shown in FIG. 9 is effective when interference is estimated in subframes where the CSI-RS is multiplexed using the CSI-RS and interference is also measured in subframes that are different from the subframes where the CSI-RS is multiplexed, using the CRS.

The pico UE is able to specify the subframe numbers where the CSI-RS is multiplexed, from the CSI-RS transmission cycle (10 ms, 8 ms, and so on) and the subframe offset value. The CSI-RS transmission cycle and the subframe offset value are sent by higher layer signaling from the pico base station. By allowing the pico base station to send the time offset value through higher layer signaling, the pico UE is able to estimate interference using the CRSs of the subframe numbers given by adding the time offset value to the subframe numbers where the CSI-RS is multiplexed, and feed back CSI, which is reception quality information acquired by estimating interference, to the pico base station.

Also, like the CSI feedback method shown in FIG. 10, cases might occur where a subframe where the CSI-RS is multiplexed is a subframe that does not correspond to a macro ABS. Assume, then, it is necessary to estimate interference using the CRS in a subframe corresponding to a macro ABS. In this case, the pico base station signals the time offset value, from subframe #2 where the CSI-RS is multiplexed, to subframe #0 corresponding to a macro ABS. The pico UE estimates interference in signaled CSI-RS subframe positions using the pico CSI-RS, and estimates interference, using the CRS, in subframe positions that are shifted by the offset value from the CSI-RS subframe positions.

Also, the pico base station may notify the type of the reference signal to estimate interference in a specific subframe. Notifying of the type of the reference signal to use to estimate interference may adopt higher layer signaling.

For example, as shown in FIG. 10, cases occur where a subframe to transmit the pico CSI-RS is a protected subframe for the pico CSI-RS but is a non-protected subframe for the CRS multiplexed on the same subframe. In this subframe, it is expressly reported that the type of the reference signal to estimate interference in that subframe is the CSI-RS and the CRS.

Alternatively, like the CSI feedback method shown in FIG. 10, cases might occur where a subframe on which the CSI-RS is multiplexed is a subframe not corresponding to a macro ABS. At this time, as for a pico UE that is located in the pico cell edge, only the CSI that is measured in protected subframes is necessary.

Then, the pico base station sends signaling of control signals that designate only the CSI-RS as the type of the reference signal, such that only measurement using the CSI-RS is carried out in subframes where the CSI-RS is multiplexed. Also, the pico base station sends signaling of control signals that designates only the CRS as the reference signal type such that only measurement using the CRS is carried out in a subframe that is difference from the subframe where the CSI-RS is multiplexed and that corresponds to a macro ABS. The types of the reference signals to estimate interference may be signaled separately or may be combined and signaled in one time.

Also, the pico base station may signal the subframe positions to be the CSI measurement target in accordance with the transmission pattern of protected subframes and non-protected subframes.

For example, with the CSI feedback method shown in FIG. 9, the pico base station notifies subframe number #0 as the protected subframe position to measure CSI, and notifies subframe number #2 as the non-protected subframe position to measure CSI. The types of the reference numbers to use to measure CSI in the protected/non-protected subframes may be reported together.

In this way, when the subframe positions to be the target of CSI measurement are signaled separately, even when the transmission patterns of protected subframes and non-protected subframes are not known, the pico UE is still able to feed back two types of CSI of the protected subframes and non-protected subframes.

A third aspect of the present invention provides a CSI feedback method that makes it possible to reduce the CSI feedback overhead upon feeding back two types of CSI of protected subframes and non-protected subframes to a pico base station.

A pico UE feeds back the CSI of a protected subframe on an as-is basis, but feeds back the CSI of a non-protected subframe in the form of a difference value between the protected subframe and the non-protected subframe. By this means, it is possible to reduce overhead compared to when the CSI of protected subframes and non-protected subframes are separately fed back.

Alternatively, when the difference value between a protected subframe and a non-protected subframe is smaller than a threshold value, only the CSI of the protected subframe is fed back, and, only when the above difference value is larger than the threshold value, are the CSI of the protected subframe and the CSI difference value between the protected subframe and the non-protected subframe fed back together. For example, the pico UE notifies the CSI of a protected subframe as a base, and, when the difference between the CSI of the protected subframe and the CSI of a non-protected subframe increases beyond a threshold value, notifies the CSI of the non-protected subframe in the form of a difference value. By this means, it is possible to reduce the overhead of CSI feedback, as long as the CSI quality of protected subframes and non-protected subframes stays within a predetermined range.

Also, it is equally possible to feed back the CSI of protected subframes and non-protected subframes in difference time cycles. For example, the pico UE feeds back the CSI of protected subframes in a relatively short cycle, and feeds back the CSI of non-protected subframes in a relatively long cycle. By this means, it is possible to reduce the total amount of CSI feedback.

Also, the pico UE may find time averages of the CSI of protected subframes and non-protected subframes separately, and feed back the separate, two types of CSI in parallel. By this means, it is possible to reduce the number of times to feed back CSI.

Also, the pico base station uses two types of CSI of protected subframes and non-protected subframes, reported from the pico UE, and adopts AMC (Adaptive Modulation and Coding) to use separate outer loop controls. Although, in AMC, the data rate is controlled by switching the modulation scheme according to the channel state, for example, in the outer loop control using the CSI of protected subframes, high-speed modulation (for example, 64QAM) is adopted, and, in the outer loop control using the CSI of non-protected subframes, low-speed modulation (for example, QPSK) is adopted.

Figure 15:
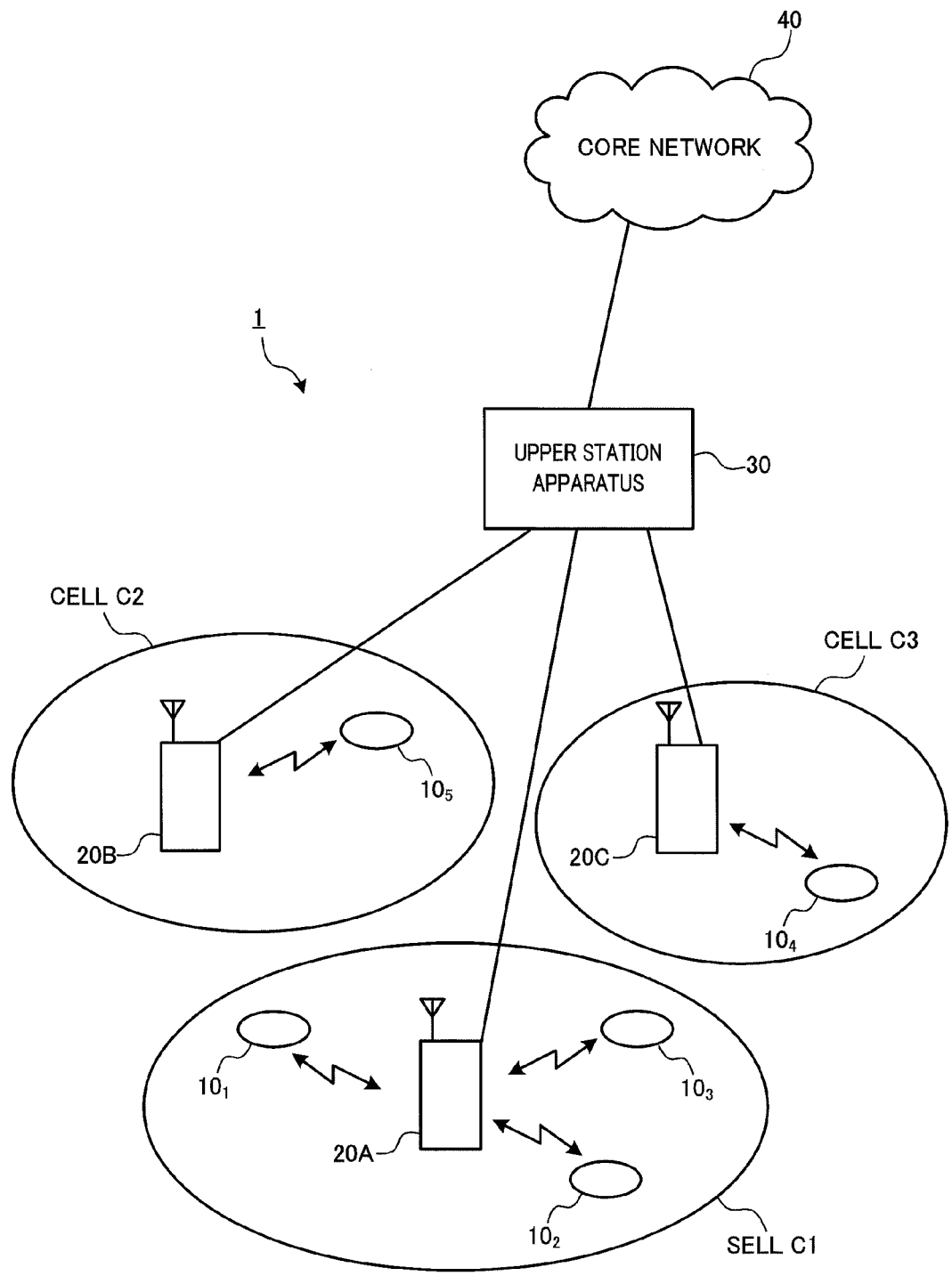
FIG. 15 is a network configuration diagram of a radio communication system.

Now, a radio communication system according to an embodiment of the present invention will be described in detail. FIG. 15 is a diagram to explain a system configuration of a radio communication system according to the present embodiment. Note that the radio communication system shown in FIG. 15 is a system to accommodate, for example, the LTE system or SUPER 3G. This radio communication system uses carrier aggregation, which makes a plurality of fundamental frequency blocks, in which the system band of the LTE system is one unit, as one. Also, this radio communication system may be referred to as "IMT-Advanced" or "4G."

As shown in FIG. 15, a radio communication system 1 is configured to include base station apparatuses 20A, 20B and 20C, and a plurality of mobile terminal apparatuses 10 ($10_1$, $10_2$, $10_3$, ... $10_n$, where n is an integer to satisfy n>0) that communicate with the base station apparatuses 20A, 20B and 20C. The base station apparatuses 20A, 20B and 20C are connected with an upper station apparatus 30, and this upper station apparatus 30 is connected with a core network 40. The mobile terminal apparatuses 10 are able to communicate with the base station apparatuses 20A, 20B and 20C in cells C1, C2 and C3. Note that the upper station apparatus 30 includes, for example, an access gateway apparatus, a radio network controller (RNC), a mobility management entity (MME) and so on, but is by no means limited to these. The present invention is applicable to a layered network typified by HetNet. In HetNet, for example, the base station apparatus 20A is a macro base station which has a wide cover area and has high transmission power, and the base station apparatus 20B is a pico base station which is located in the cover area of the base station apparatus 20A and which has lower transmission power than the macro base station.

Each mobile terminal apparatus ($10_1, 10_2, 10_3, \ldots 10_n$) may be either an LTE terminal or an LTE-A terminal, but the following descriptions will be given simply with respect to "mobile terminal apparatus 10," unless specified otherwise. Also, although the mobile terminal apparatuses 10 perform radio communication with the base station apparatuses 20A, 20B and 20C, for ease of explanation, more generally, user apparatuses (UE: User Equipment) including mobile terminal apparatuses and fixed terminal apparatuses may be used as well.

In the radio communication system 1, for radio access schemes, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channels in the LTE system will be described. The downlink communication channels include a PDSCH (Physical Downlink Shared Channel), which is used by each mobile terminal apparatus 10 on a shared basis as a downlink data channel, and downlink L1/L2 control channels (PDCCH, PCFICH, and PHICH). Transmission data and higher control information are transmitted by the PDSCH. The scheduling information of the PDSCH and the PUSCH and so on are transmitted by the PDCCH (Physical Downlink Control Channel). The number of OFDM symbols to use for the PDCCH is transmitted by the PCFICH (Physical Control Format Indicator Channel). HARQ ACK/NACK for the PUSCH are transmitted by the PHICH (Physical Hybrid-ARQ Indicator Channel).

The uplink communication channels include a PUSCH (Physical Uplink Shared Channel), which is used by each mobile terminal apparatus on a shared basis as an uplink data channel, and a PUCCH (Physical Uplink Control Channel), which is an uplink control channel. By means of this PUSCH, transmission data and higher control information are transmitted. Also, by the PUCCH, the CSI, which is reception quality information using reference signals (CSI-RS and CRS), downlink radio quality information (CQI: Channel Quality Indicator), ACK/NACK, and so on are transmitted.

Figure 16:
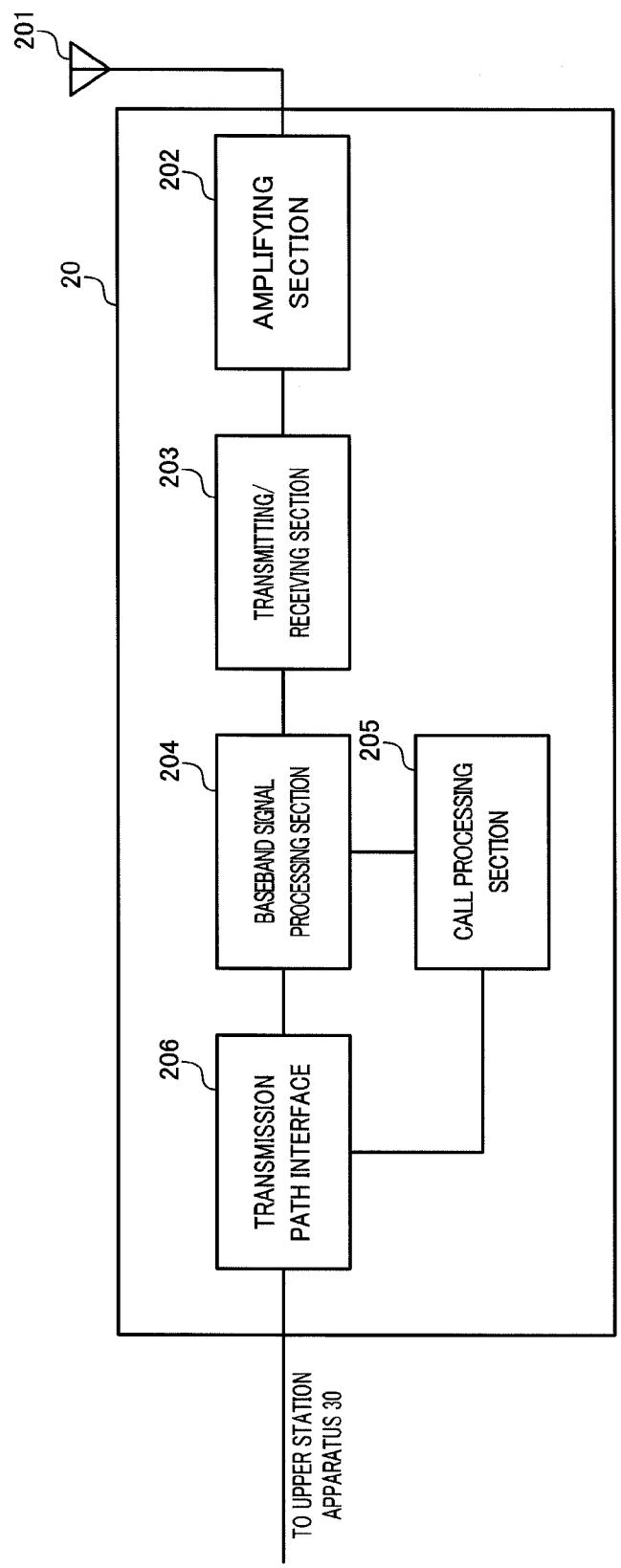
FIG. 16 is a diagram to explain an overall configuration of a base station apparatus.

Referring to FIG. 16, an overall configuration of a base station apparatus according to the present embodiment will be described. Note that the base station apparatuses 20A (for example, a macro base station), 20B (for example, a pico base station), and 20C have the same configuration and therefore will be described simply as "base station apparatus 20." The base station apparatus 20 has a transmitting/receiving antenna 201, an amplifying section 202, a transmitting/receiving section (notifying section) 203, a baseband signal processing section 204, a call processing section 205, and a transmission path interface 206. Transmission data to be transmitted from the base station apparatus 20 to the mobile terminal apparatus 10 on the downlink is input from the higher station apparatus 30, in the baseband signal processing section 204, via the transmission path interface 206.

In the baseband signal processing section 204, a downlink data channel signal is subject to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as for the signal of the physical downlink control channel, which is a downlink control channel, transmission processes such as channel coding and inverse fast Fourier transform are performed.

Also, the baseband signal processing section 204 notifies control information for allowing the mobile terminal apparatus 10 to communicate with the base station apparatus 20, to the mobile terminal apparatuses 10 connected to the same cell, by a broadcast channel. Broadcast information for allowing communication in the cell includes, for example, the uplink or downlink system bandwidth, identification information of a root sequence (root sequence index) for generating random access preamble signals in the PRACH, and so on.

In the transmitting/receiving section 203, the baseband signal output from the baseband signal processing section 204 is subjected to frequency conversion into a radio frequency band. The amplifying section 202 amplifies the transmission signal subjected to frequency conversion, and outputs the result to the transmitting/receiving antenna 201.

Meanwhile, as for signals to be transmitted on the uplink from the mobile terminal apparatus 10 to the base station apparatus 20, a radio frequency signal that is received in the transmitting/receiving antenna 201 is amplified in the amplifying section 202, subjected to frequency conversion and converted into a baseband signal in the transmitting/receiving section 203, and is input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signal is transferred to the upper station apparatus 30 through the transmission path interface 206.

The call processing section 205 performs call processes such as setting up and releasing communication channels, manages the state of the base station apparatus 20 and manages the radio resources.

Figure 17:
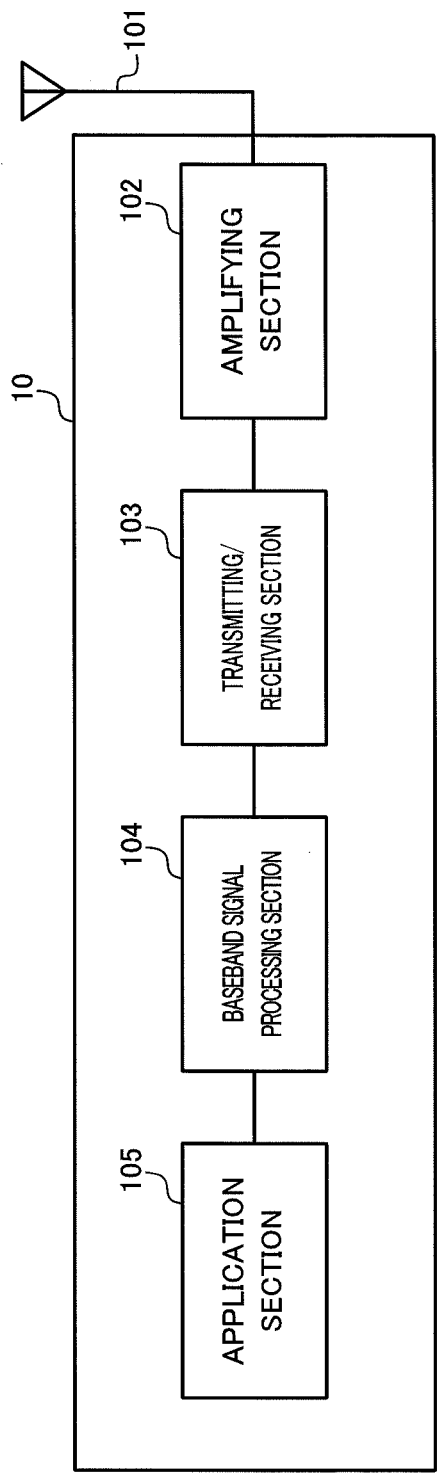
FIG. 17 is a diagram to explain an overall configuration of a mobile terminal apparatus.

Next, referring to FIG. 17, an overall configuration of a mobile terminal apparatus according to the present embodiment will be described. An LTE terminal and an LTE-A terminal have the same hardware configurations in the principle parts, and therefore will be described indiscriminately. The mobile terminal apparatus 10 has a transmitting/receiving antenna 101, an amplifying section 102, a transmitting/receiving section (receiving section) 103, a baseband signal processing section 104, and an application section 105.

As for downlink data, a radio frequency signal received in the transmitting/receiving antenna 10 is amplified in the amplifying section 10, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to upper layers above the physical layer and the MAC layer. Also, in the downlink data, broadcast information is also transferred to the application section 105.

Meanwhile, uplink transmission data is input from the application section 105 to the baseband signal processing section 104. The baseband signal processing section 104 performs a mapping process, a retransmission control (HARQ) transmission process, channel coding, a DFT process, and an IFFT process. The baseband signal output from the baseband signal processing section 104 is converted into a radio frequency band in the transmitting/receiving section 103, and, after that, amplified in the amplifying section 102 and transmitted from the transmitting/receiving antenna 101.

Figure 18:
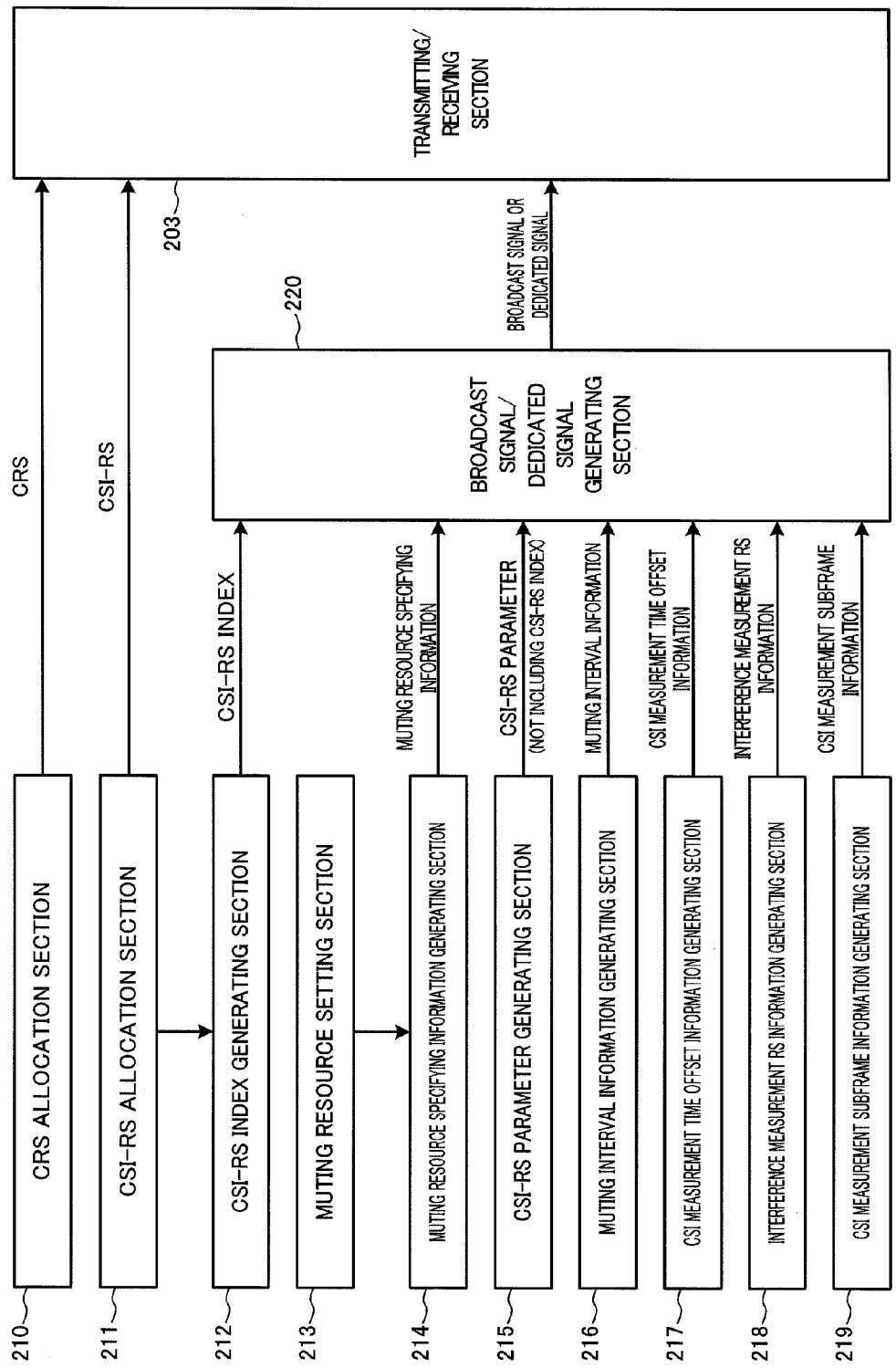
FIG. 18 is a functional block diagram of a base station apparatus related to CSI-RS signaling.

The function blocks of the pico base station apparatus 20B will be described with reference to FIG. 18. Note that the function blocks of FIG. 18 are primarily the processing content of the baseband processing section. Also, the function blocks shown in FIG. 18 are simplified to explain the present invention, and assumed to have the configurations which a baseband processing section normally has. Also, in the following descriptions, indices for specifying the resources where the CSI-RS is arranged will be described as CSI-RS indices.

As shown in FIG. 18, the pico base station apparatus 20B has a CRS allocation section 210, a CSI-RS allocation section 211, a CSI-RS index generating section 212, a muting resource setting section 213, a muting resource specifying information generating section 214, a CSI-RS parameter generating section 215, a muting interval information generating section 216, a CSI measurement time offset information generating section 217, an interference measurement RS information generating section 218, a CSI measurement subframe information generating section 219, a broadcast signal/dedicated signal generating section 220, and a transmitting/receiving section 203.

The CRS allocation section 210 allocates the CRS in the CRS transmission resource in the resource block of each subframe. The CRS is allocated on an applicable resource element on a resource block in accordance with a CRS allocation pattern in which the CRS allocation positions are defined such that the CRS does not overlap other control signals.

The CSI-RS allocation section 211 allocates the CSI-RS in applicable subframes in a radio frame in a CSI-RS transmission cycle (for example, 10 ms or 8 ms). For example, in the example shown in FIG. 9, the CSI-RS is allocated in pico subframes in a 10-ms cycle. To be more specific, the CSI-RS is allocated in the CSI-RS transmission resource on the resource block in the target subframe. The CSI-RS transmission resources may as well be determined according to a CSI-RS pattern to match the number of CSI-RS ports.

The CSI-RS index generating section 212 generates a CSI-RS index that corresponds to the CSI-RS transmission resource on a resource block. The CSI-RS index generated in the CSI-RS index generating section 212 is input in the broadcast signal/dedicated signal generating section 220 as one of the CSI-RS parameters.

The muting resource setting section 213 sets a resource which corresponds to the CSI-RS transmission resource originally in a neighboring cell, as a muting resource. The operation to stop the transmission of the PDSCH by the same resource as the resource to transmit the CSI-RS in the neighboring cell, is one way of muting, by cooperative transmission, in HetNet. Meanwhile, the neighboring base station of the pico base station is a macro base station. As shown in FIG. 9 and FIG. 11, when the pico base station transmits a CSI-RS in the same subframe as the macro cell, the PDSCH that is transmitted in the pico cell is severely influenced by the CSI-RS (interference) of the macro cell, and its accuracy decreases significantly. When the reception quality in the pico cell decreases due to the influence (interference) of the CSI-RS of the macro cell, there is a possibility that the PDSCH that is transmitted in the pico cell may keep being retransmitted. When a CSI-RS is transmitted using the same subframe as the subframe to transmit a CSI-RS in the macro cell, it is preferable to mute the PDSCH in the subframe.

The muting resource specifying information generating section 214 generates muting resource specifying information for muting the PDSCH in the subframe to transmit the pico CSI-RS. The muting resource specifying information represents the resources to mute the PDSCH. As the muting resource specifying information, bitmap information or a muting resource arrangement pattern is generated. When the muting resource specifying information is notified to the mobile terminal apparatus 10, which equals a pico UE, the resources shown in the muting resource specifying information are recognized as muting resources on the mobile terminal apparatus 10 side. The muting resource specifying information is input in the broadcast signal/dedicated signal generating section 220 as one of the muting parameters.

The CSI-RS parameter generating section 215 generates parameters other than the CSI-RS indices, such as the CSI-RS sequence and transmission power. The CSI-RS parameters generated in the CSI-RS parameter generating section 215 are input in the broadcast signal/dedicated signal generating section 220.

The muting interval information generating section 216 generates muting interval information, which indicates a common transmission interval that is shared between a plurality of cells, in association with all the subframes for CSI-RS transmission among a plurality of cells C1 to C3. The muting interval information generating section 216 generates muting interval information based on the CSI-RS transmission cycle in the subject cell and the CSI-RS transmission cycle acquired from the neighboring cell. The muting interval information generated in the muting interval information generating section 216 is input in the broadcast signal/dedicated signal generating section 220.

The CSI measurement time offset information generating section 217 generates a time offset value as information to specify the subframes to measure two types of CSI of a protected subframe and a non-protected subframe. For example, in the example shown in FIG. 9, in pico cell radio frames, measurement of two types of CSI is made possible, by estimating interference using the CSI-RS in subframe #0 and by estimating interference using the CRS in subframe #2. If the protected subframes are fixed to subframe #0 where the CSI-RS is allocated, then, subframe #2, which is two subframes shifted from subframe #0, is the non-protected subframes. In this case, the time offset value is set in subframe #2. Also, it is equally possible to fix the non-protected subframe to allow the protected subframe to be specified by the time offset value. The time offset value may also be referred to as the time difference between the protected subframe and the non-protected subframe.

The interference measurement RS information generating section 218 generates interference measurement RS type information, which indicates the type of the reference signal to estimate interference in the target subframes. By the interference measurement RS type information, the reference signal type to use to estimate interference in the protected subframes and the reference signal type to estimate interference in the non-protected subframes are notified. For example, although pico subframes #0 and #9 shown in FIG. 9 are protected subframes, for a pico UE that requires only the CSI of protected subframes, the CSI-RS is set as the interference measurement RS in pico subframe #0, and the CRS is set as the interference measurement RS in pico subframe #9. Also, pico subframe #2 shown in FIG. 10 is a protected subframe for the pico CSI-RS, but is a non-protected subframe for the CRS. As shown in FIG. 10, when a subframe where the CSI-RS is multiplexed is a subframe that does not correspond to a macro ABS, for a pico UE that is located in the pico cell edge, only the CSI measured in protected subframes is required. In this case, only the CSI-RS is set in interference measurement RS type information with respect to subframes where the CSI-RS is multiplexed, and the CRS is set in interference measurement RS type information with respect to subframe #0 corresponding to a macro ABS. By this means, it is possible to signal the interference measurement RS to make possible CSI measurement using protected subframes alone, to the pico UE located in the pico cell edge. Also, the resource allocation to a pico UE located around the cell center of the pico cell (not including the cell edge) requires the CSI of both protected subframes and non-protected subframes. In this case, two types of the CSI-RS and the CRS are set as interference measurement RS type information with respect to the subframes where the CSI-RS is multiplexed. By this means, it is possible to realize CSI measurement of protected subframes using the CSI-RS, and realize CSI measurement of a non-protected subframe in the same subframe as the CRS. The interference measurement RS type information generated in the interference measurement RS information generating section 218 is input in the broadcast signal/dedicated signal generating section 220.

The CSI measurement subframe information generating section 214 generates CSI measurement subframe information to specify the subframe positions to be the target of CSI measurement. Although the CSI measurement time offset information generating section 217 designates the subframe positions to be the CSI measurement target using a time offset value, the CSI measurement subframe information generating section 214 directly designates the CSI measurement target subframes by subframe positions. The type of the reference signal to be used to estimate interference in signaled subframes may use interference measurement RS type information. The CSI measurement subframe information generated in the CSI measurement subframe information generating section 214 is input in the broadcast signal/dedicated signal generating section 220.

The broadcast signal/dedicated signal generating section 220 generates broadcast signals or dedicated signals including CSI-RS indices, muting resource specifying information, muting interval information, other CSI-RS parameters, CSI measurement time offset information, interference measurement RS information, CSI measurement subframe information. The information to be reported to all the mobile terminal apparatuses 10 in the pico cell (for example, the CSI-RS indices and other CSI-RS parameters) is generated as broadcast signals, and information to be reported to each individual mobile terminal apparatus 10 (muting resource specifying information, CSI measurement time offset information, interference measurement RS information, and CSI measurement subframe information) is generated as dedicated signals. The broadcast signals and dedicated signals generated in the broadcast signal/dedicated signal generating section 220 are sent by higher layer signaling. The transmitting/receiving section 203 maps the CRS, CSI-RS and broadcast signals/dedicated signals to resources, and transmits these to the mobile terminal apparatus 10.

Figure 19:
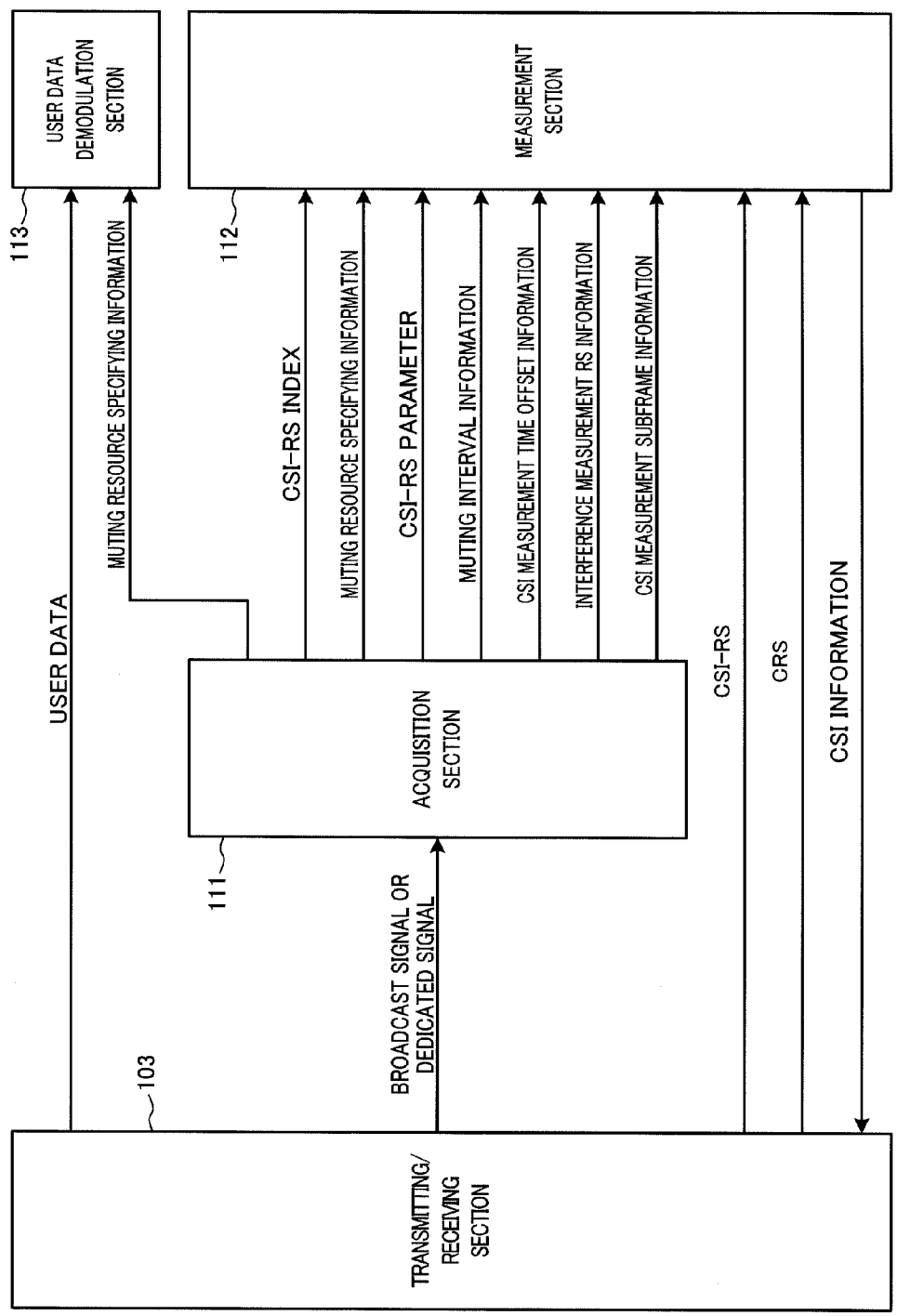
FIG. 19 is a functional block diagram of a mobile terminal apparatus related to CSI feedback.

The function blocks of the mobile terminal apparatus 10, which serves as a pico UE, will be described with reference to FIG. 19. Note that the function blocks of FIG. 19 are primarily the processing content of the baseband processing section. Also, the function blocks shown in FIG. 19 are simplified to explain the present invention, and assumed to have the configurations which a baseband processing section normally has.

As shown in FIG. 19, the mobile terminal apparatus 10 has a transmitting/receiving section 103, an acquisition section 111, a measurement section 112, and a user data demodulation section 113. The to transmitting/receiving section 103 receives the control channel (CRS, CSI-RS and so on) and the broadcast channel (broadcast signal/dedicated signal) and so on transmitted from the pico base station apparatus 20B, and also receives the data channel (user data).

The acquisition section 111 analyzes the broadcast signal/dedicated signal received by the transmitting/receiving section 103, and acquires the CSI-RS parameters including the CSI-RS indices, muting resource specifying information, muting interval information, CSI measurement time offset information, interference measurement RS information, and CSI measurement subframe information.

The measurement section 112 performs the following CSI measurement to feed back two types of CSI of protected subframes and non-protected subframes. The subframes to be the CSI measurement target and the types of the reference signals to be used in CSI measurement are signaled using the broadcast signal/dedicated signal. The measurement section 112 is able to specify the subframes to be the target of CSI measurement and the interference measurement RS type in each target subframe, by the combination of the CSI measurement time offset information and the interference measurement RS information. For example, by reporting the CSI-RS transmission cycle and the subframe offset value from the pico base station to the mobile terminal apparatus 10, it is possible to specify another CSI measurement subframe by adding the time offset based on a CSI-RS subframe position. Alternately, the measurement section 112 is able to specify the subframes to be the target of CSI measurement and the interference measurement RS type in each target subframe, by the combination of interference measurement RS information and CSI measurement subframe information. Given that the subframe positions to be used in CSI measurement are directly designated by the CSI measurement subframe information, it is possible to specify the subframe positions to use for CSI measurement alone by the CSI measurement subframe information alone. Also, the measurement section 112 specifies the CSI-RS resource where the CSI-RS is multiplexed on a resource block from the CSI-RS index.

In the example shown in FIG. 9, interference is estimated from the pico CSI-RS received in subframe #0, which is a protected subframe. Given that subframe #0 in the pico cell is a protected subframe, accurate interference measurement is made possible in an environment in which there is little interference from the macro base station. Furthermore, when the CSI of non-protected subframes is necessary, the CSI measurement subframe position information and the interference measurement RS information are notified from the pico base station. For example, CSI measurement using the CRS in pico subframe #2 is notified. The measurement section 112 estimates interference from the CRS in pico subframe #2. The CSI that is measured using the CSI-RS in subframe #0, which is a protected subframe, and the CSI that is measured using the CSI in pico subframe #2, which is a non-protected subframe, are given to the transmitting/receiving section 103. The transmitting/receiving section 103 feeds back the two types of CSI of protected subframes and non-protected subframes to the pico base station.

Also, as shown in the example of FIG. 10, interference is estimated from the pico CSI-RS received in subframe #2, which is a subframe outside a from macro ABS, and also interference is estimated from the CRS received in the same subframe #2. The pico subframe #2 is not an ABS period but mutes the pico CSI-RS resource in the macro cell, so that, by estimating interference using the CSI-RS, the CSI for a protected subframe which does not receive interference from the macro base station is measured. Also, pico subframe #2 is not an ABS period, and therefore resources other than the pico CSI-RS resource receive interference from the macro cell. By estimating interference from the CRS received in the same subframe #2, the CSI for a non-protected subframe which receives interference from the macro base station is measured. In this way, two types of CSI acquired by estimating interference using both the pico CSI-RS and the CRS in the same subframe #2 are given to the transmitting/receiving section 103. The transmitting/receiving section 103 feeds back the two types of CSI of protected subframes and non-protected subframes, to the pico base station.

Also, when it is necessary to measure CSI in a subframe corresponding to a macro ABS, subframe #0, which corresponds to a macro ABS, is reported as the CSI measurement subframe from the pico base station, and the CRS is reported as the interference measurement RS in that subframe #0. In this case, in addition to the interference measurement using the CSI-RS in subframe #2, interference is estimated using the CRS in subframe #0, which is a protected subframe. In this way, two types of CSI acquired by estimating interference using the CSI-RS and the CRS in two protected subframes (subframes #0 and #2) are given to the transmitting/receiving section 103. The transmitting/receiving section 103 feeds back the two types of CSI acquired in the two protected subframes, to the pico base station.

Also, in the example shown in FIG. 12, depending on the transmission position of the pico CSI-RS, a frame may be a protected subframe or a non-protected subframe. By estimating interference using the CSI-RS in which the pico CSI-RS is received, as a result, two types of CSI of protected subframes and non-protected subframes are measured. CSI-RS transmission subframe #1 is notified from the pico base station as the CSI measurement subframe, and the CSI-RS alone is notified as the interference measurement RS in subframe #1. The measurement section 112 measures interference using the CSI-RS in each individual subframe #1, thereby measuring two types of CSI of protected subframes and non-protected subframes unevenly. In this way, two types of CSI of protected subframes and non-protected subframes are given to the transmitting/receiving section 103. The transmitting/receiving section 103 feeds back the two types of CSI to the pico base station.

Also, the measurement section 112 may find a time-average of the CSI of protected subframes and a time average of the CSI of non-protected subframes separately. By this means, the CSI measured in protected subframes which are prevented from interference and the CSI measured in non-protected subframes which receive severe interference, are averaged separately, so that it is possible to measure reception quality more accurately.

The user data demodulating section 113 demodulates the user data received via the transmitting/receiving section 103. The user data demodulating section 113 excludes the muting resources shown in the muting resource specifying information from the target of the demodulation process, and demodulates the user data. Consequently, the throughput of the demodulation process and the accuracy of demodulation are improved. Note that, instead of providing the user data demodulating section 113, it is equally possible to perform the user data demodulation process in the acquisition section 111.

Now, when two types of CSI of protected subframes and non-protected subframes are fed back, the overhead of CSI feedback increases. Now, reduction of the overhead of CSI feedback will be described below.

Figure 20:
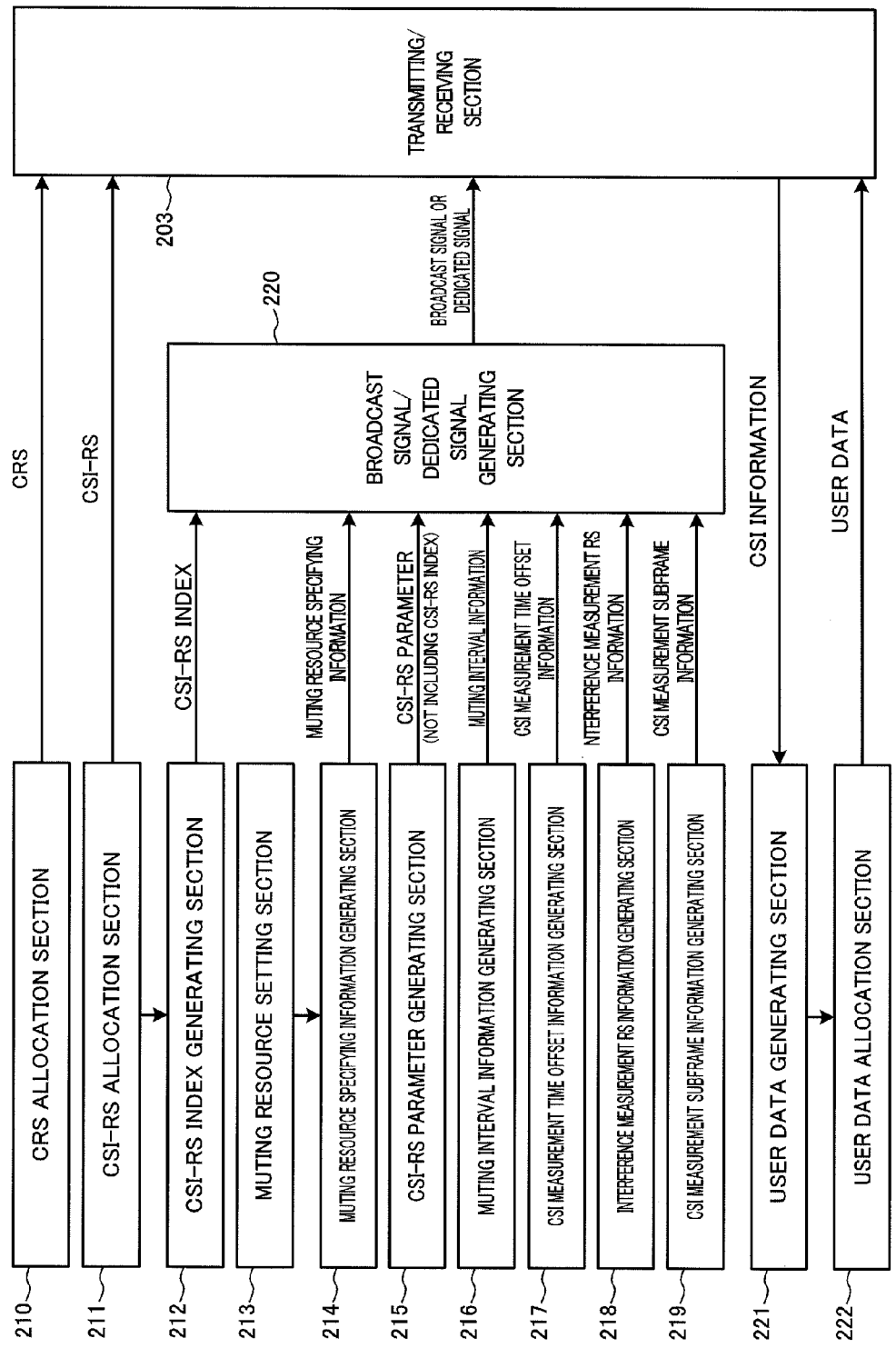
FIG. 20 is a functional block diagram of a base station apparatus, related to CSI-RS signaling, according to a modified example.

The function blocks of a pico base station apparatus will be described with reference to FIG. 20. Note that the same parts as in the function blocks of the base station apparatus shown in FIG. 18 are assigned the same codes. As shown in FIG. 20, the pico base station apparatus 20B has a CRS allocation section 210, a CSI-RS allocation section 211, a CSI-RS index generating section 212, a muting resource setting section 213, a muting resource specifying information generating section 214, a CSI-RS parameter generating section 215, a muting interval information generating section 216, a CSI measurement time offset information generating section 217, an interference measurement RS information generating section 218, a CSI measurement subframe information generating section 219, a broadcast signal/dedicated signal generating section 220, a user data generating section 221, a user data allocation section 222, and a transmitting/receiving section 203.

New functions are added in the user data generating section 221 in relationship to CSI feedback. The user data generating section 221 acquires two types of CSI of a protected subframe and a non-protected subframe, from CSI information reported in a special compressed format that matches the reporting method of the CSI to be fed back from a pico UE and that is for reducing the amount of CSI feedback. The user data generating section 221 determines radio resource allocation on a per user basis from the CSI that is fed back.

The user data allocation section 222 allocates user data in accordance with the radio resource assignment per user.

Figure 21:
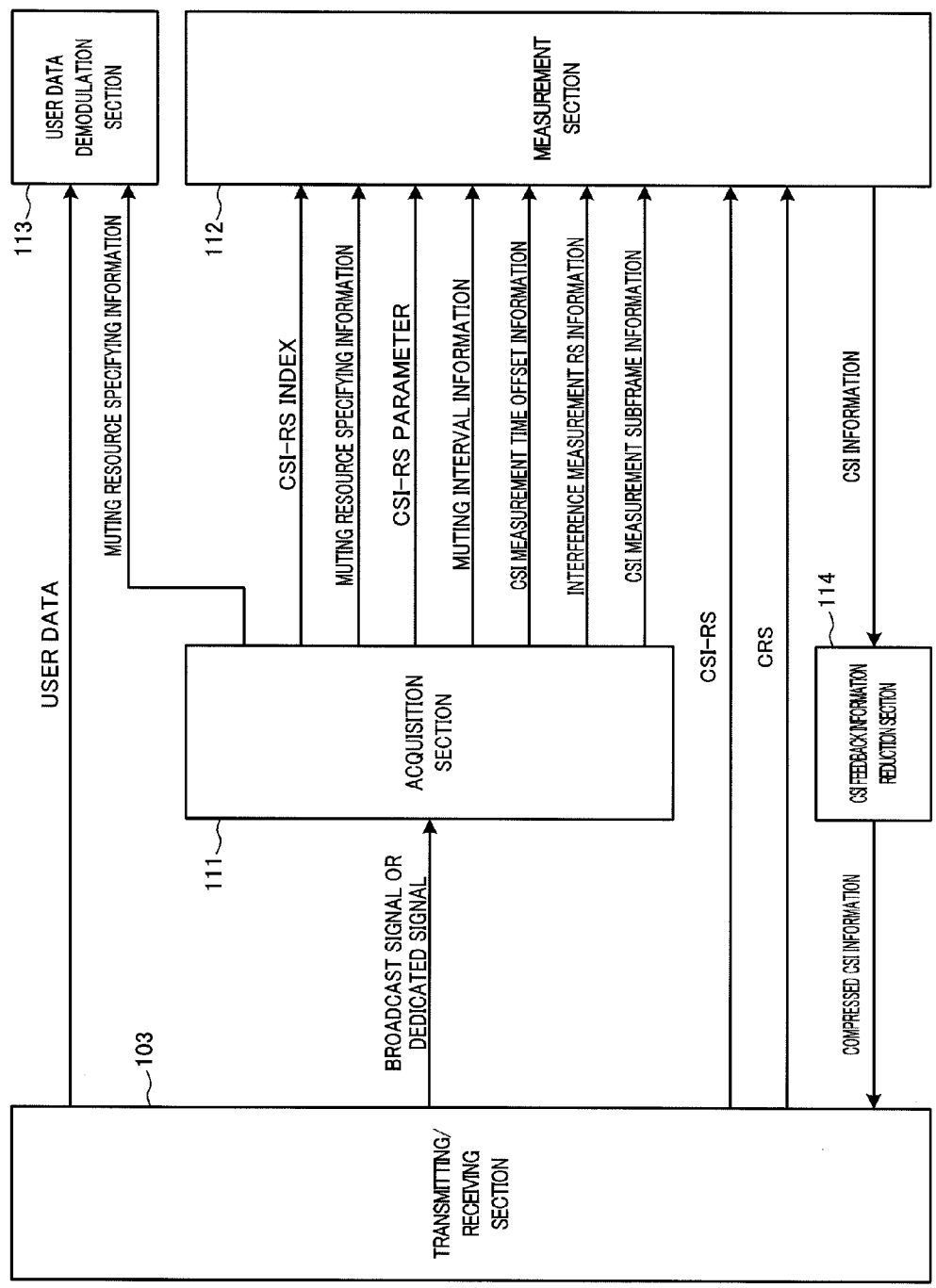
FIG. 21 is a functional block diagram of a mobile terminal apparatus, related to CSI feedback, according to a modified example.

The functions blocks of a mobile terminal apparatus 10 will be described with reference to FIG. 21. The same parts as the function blocks of the mobile terminal apparatus 10 shown in FIG. 19 will be assigned the same codes. As shown in FIG. 21, the mobile terminal apparatus 10 has a transmitting/receiving section 103, an acquisition section 111, a measurement section 112, a user data demodulation section 113, and a CSI feedback information reduction section 114.

The acquisition section 111 acquires two types of CSI of protected subframes and non-protected subframes, as described above. When two types of CSI of a protected subframe and a non-protected subframe are measured, the CSI feedback information reduction section 114 finds the difference value between the two types of CSI of the protected subframe and the non-protected subframe. The difference value between the two types of CSI of the protected subframe and the non-protected subframe serves as compressed CSI information. The CSI of a protected subframe is transmitted in normal format, but the CSI of a non-protected subframe is converted into a format of a difference value between the CSI of the protected subframe and the non-protected subframe, and fed back. The CSI of the protected subframe acquired in this way and the compressed CSI information related to the CSI of the non-protected subframe are reported from the transmitting/receiving section 103 to the pico base station apparatus 20B.

By this means, compared to the case of feeding back two types of CSI of protected subframes and non-protected subframes separately, it is possible to reduce the amount of CSI feedback.

Also, the CSI feedback information reduction section 114 normally feeds back the CSI of protected subframes alone, and, when the difference between the CSI of a protected subframe and the CSI of a non-protected subframe exceeds beyond a threshold value, notifies the CSI of the non-protected subframe in the form of a difference value. That is to say, the CSI feedback information reduction section 114 constantly calculates and monitors the difference value between the CSI of a protected subframe and the CSI of a non-protected subframe, and, when the difference between CSI of a protected subframe and the CSI of a non-protected subframe increases beyond a threshold value, additionally feeds back the difference value between the CSI of the protected subframe and the CSI of the non-protected subframe, in addition to the feedback of the CSI of the protected subframe alone.

By this means, as long as the CSI quality of protected subframes and non-protected subframes stays within a predetermined range, it is possible to reduce the overhead of CSI feedback.

Alternatively, the CSI feedback information reduction section 114 may feed back the CSI of protected subframes and the CSI of non-protected subframes in different time cycles. For example, the CSI of protected subframes may be fed back in a relatively short time cycle, and the CSI of non-protected subframes may be fed back in a relatively long time cycle.

By this means, it is possible to maintain feeding back two types of CSI of protected subframes and non-protected subframes and also reduce the amount of CSI feedback.

In the pico base station apparatus 20B, when the CSI of a non-protected subframe reported from the mobile station apparatus 10 is represented by the difference value from the CSI of a protected subframe, the user data generating section 221 reconstructs the CSI of the non-protected subframe using the CSI of the protected subframe and the difference value reported as compressed CSI information.

Also, in the period in which only the CSI of a protected subframe is fed back, the user data generating section 221 sees the CSI of a non-protected subframe to be the same as the CSI of the protected subframe, and allocates radio resources to the user based on the same CSI value.

Also, the user data generating section 221 may adopt AMC using individual outer loop controls, using two types of CSI of protected subframes and non-protected subframes. For example, the outer loop control using the CSI of protected subframes may adopt high-speed modulation (for example, 64QAM), and the outer loop control using the CSI of non-protected subframes may adopt low-speed modulation (for example, QPSK).

The present invention is by no means limited to the above embodiments and can be implemented in various modifications. For example, within the scope of the present invention, it is possible to change the setting positions of muting resources, the number of processing sections, the order of steps, and the number of muting resources in the above descriptions, as appropriate. Besides, the present invention can be implemented with various changes, without departing from the scope of the present invention.

The disclosure of Japanese Patent Application No. 2010-250096, filed on Nov. 8, 2010, including the specification, drawings and abstract, is incorporated herein by reference in its entirety.

The invention claimed is:

1. A mobile terminal apparatus comprising:
   a receiver that receives configured to receive a protected subframe in a victim cell corresponding to a subframe with reduced transmission power in an aggressor cell, and a non-protected subframe in the victim cell corresponding to a subframe with unreduced transmission power in the aggressor cell, CRS (Cell-specific Reference Signal) being multiplexed on each of the subframes including the protected subframe and the non-protected subframe, CSI-RS (Channel State Information-Reference Signal) being multiplexed on the protected subframe or the non-protected subframe in a predetermined cycle, and the CRS and the CSI-RS being reference signals;
   a measurement circuit that measures channel quality from the reference signals multiplexed individually on the protected subframe and the non-protected subframe; and
   a transmitter that notifies a base station apparatus of two types of channel quality information of the protected subframe and the non-protected subframe, measured by the measurement circuit.

2. The mobile terminal apparatus according to claim 1, wherein a subframe position to measure the channel quality of the protected subframe and a subframe position to measure the channel quality of the non-protected subframe are each set by signaling.

3. The mobile terminal apparatus according to claim 1, wherein information for specifying subframes to measure the two types of channel quality of the protected subframe and the non-protected subframe is given by higher layer signaling.

4. The mobile terminal apparatus according to claim 1, wherein:
   the measurement circuit measures the channel quality in the protected subframe or the non-protected subframe on which the CSI-RS is multiplexed, by estimating interference using the CSI-RS, and measures the channel quality, in the protected subframe or the non-protected subframe that is different from the subframe on which the CSI-RS is multiplexed, by estimating interference using the CRS; and
   the transmitter notifies the base station apparatus of the two types of channel quality information measured using the CSI-RS and the CRS.

5. The mobile terminal apparatus according to claim 1, wherein the measurement circuit measures the channel quality, in the protected subframe or the non-protected subframe, on which the CSI-RS is multiplexed by estimating interference using the CSI-RS, and measures the channel quality in a subframe which is different from the subframe on which the CSI-RS is multiplexed, and in which transmission of a data channel by the aggressor cell is stopped, by estimating interference using the CRS.

6. The mobile terminal apparatus according to claim 1, wherein, in a same subframe on which the CSI-RS and the CRS are multiplexed, the measurement circuit measures the two types of channel quality by estimating interference using the CSI-RS and the CRS.

7. The mobile terminal apparatus according to claim 1, wherein:
   The receiver receives a broadcast signal or a dedicated signal that is notified from a base station apparatus of the victim cell; and
   the measurement circuit specifies a subframe position of one of the protected subframe and the non-protected subframe, using a time offset value, which is acquired from the broadcast signal or the dedicated signal, and which indicates a time difference between subframes that are a target of CSI measurement.

8. The mobile terminal apparatus according to claim 1, wherein:
   The receiver receives a broadcast signal or a dedicated signal that is notified from a base station apparatus of the victim cell; and
   the measurement circuit specifies a type of a reference signal to be measured in a subframe that is a target of CSI measurement, according to interference measurement reference signal information that is acquired from the broadcast signal or the dedicated signal.

9. The mobile terminal apparatus according to claim 1, wherein:
the receiver receives a broadcast signal or a dedicated signal that is notified from a base station apparatus of the victim cell; and
the measurement circuit specifies a subframe position to be a target of CSI measurement, according to CSI measurement subframe information that is acquired from the broadcast signal or the dedicated signal.

10. A base station apparatus comprising:
a transmitter that transmits radio frames of a victim cell including a protected subframe in the victim cell corresponding to a subframe with reduced transmission power in an aggressor cell, and a non-protected subframe in the victim cell corresponding to a subframe with unreduced transmission power in the aggressor cell;
a CSI-RS allocation circuit configured to multiplex a CSI-RS (Channel State Information-Reference Signal), which is one of reference signals, on the protected subframe or on the non-protected subframe, in a predetermined cycle;
a CRS allocation circuit configured to multiplex a CRS (Cell-specific Reference Signal), which is one of the reference signals, on each subframe constituting the radio frames of the victim cell;
a receiver that receives two types of channel quality information of the protected subframe and the non-protected subframe that is fed back from a mobile terminal apparatus having received the radio frames in the victim cell; and
a user data allocation process configured to allocate radio resources to the mobile terminal apparatus using the two types of channel quality information fed back from the mobile terminal apparatus.

11. The base station apparatus according to claim 10, wherein a subframe position to measure the channel quality of the protected subframe and a subframe position to measure the channel quality of the non-protected subframe are individually signaled to the mobile terminal apparatus.

12. The base station apparatus according to claim 10, wherein information for specifying subframes to measure the two types of channel quality of the protected subframe and the non-protected subframe is signaled with higher layer signaling to the mobile terminal apparatus.

13. The base station apparatus according to claim 10, wherein a time offset value, which indicates a time difference between subframes to be a target of CSI measurement, is signaled to the mobile terminal apparatus by a broadcast signal or a dedicated signal.

14. The base station apparatus according to claim 10, wherein interference measurement reference signal information, in which a type of a reference signal to be measured in a subframe that is a target of CSI measurement is set, is signaled to the mobile terminal apparatus by a broadcast signal or a dedicated signal.

15. The base station apparatus according to claim 10, wherein CSI measurement subframe information, which designates a subframe position to be a target of CSI measurement, is signaled to the mobile terminal apparatus by a broadcast signal or a dedicated signal.

16. A CSI feedback method comprising the steps of:
receiving radio frames including a protected subframe in a victim cell corresponding to a subframe with reduced transmission power in an aggressor cell, and a non-protected subframe in the victim cell corresponding to a subframe with unreduced transmission power in the aggressor cell, CRS (Cell-specific Reference Signal) being multiplexed on each of the subframes including the protected subframe and the non-protected subframe, CSI-RS (Channel State Information-Reference Signal) being multiplexed on the protected subframe or the non-protected subframe in a predetermined cycle, and the CRS and the CSI-RS being reference signals;
measuring channel quality from the reference signals multiplexed individually on the protected subframe and the non-protected subframe; and
notifying by a transmitter, a base station apparatus of measured two types of channel quality information of the protected subframe and the non-protected subframe.

17. A communication control method comprising the steps of:
transmitting, by a transmitter, radio frames including a protected subframe in a victim cell corresponding to a subframe with reduced transmission power in an aggressor cell, and a non-protected subframe in the victim cell corresponding to a subframe with unreduced transmission power in the aggressor cell;
multiplexing a CSI-RS (Channel State Information-Reference Signal), which is one of reference signals, on the protected subframe or on the non-protected subframe, in a predetermined cycle;
multiplexing a CRS (Cell-specific Reference Signal), which is one of the reference signals, on each subframe constituting the radio frames of the victim cell;
receiving two types of channel quality information of the protected subframe and the non-protected subframe that is fed back from a mobile terminal apparatus having received the radio frames in the victim cell; and
allocating radio resources to the mobile terminal apparatus using the two types of channel quality information fed back from the mobile terminal apparatus.

18. A radio communication system comprising: a base station apparatus; and a mobile terminal apparatus connected to the base station apparatus,
the base station apparatus comprising:
a transmitter that transmits radio frames of a victim cell including a protected subframe in the victim cell corresponding to a subframe with reduced transmission power in an aggressor cell and a non-protected subframe in the victim cell corresponding to a subframe with unreduced transmission power in the aggressor cell;
a CSI-RS allocation circuit configured to multiplex a CSI-RS (Channel State Information-Reference Signal), which is one of reference signals, on the protected subframe or on the non-protected subframe, in a predetermined cycle;
a CRS allocation circuit configured to multiplex a CRS (Cell-specific Reference Signal), which is one of the reference signals, on each subframe constituting the radio frames of the victim cell;
a receiver that receives two types of channel quality information of the protected subframe and the non-protected subframe that is fed back from the mobile terminal apparatus having received the radio frames in the victim cell; and
a user data allocation process configured to allocate radio resources to the mobile terminal apparatus, and the mobile terminal apparatus comprising:
- a receiver that receives the protected subframe in the victim cell and the non-protected subframe in the victim cell, the CRS being multiplexed on each of the subframes including the protected subframe and the non-protected subframe, and the CSI-RS being multiplexed on the protected subframe or the non-protected subframe in a predetermined cycle;
- a measurement circuit configured to measure channel quality from the reference signals multiplexed individually on the protected subframe and the non-protected subframe; and
- a transmitter that notifies the base station apparatus of the two types of channel quality information of the protected subframe and the non-protected subframe, measured by the measurement circuit.

* * * * *